United States Patent
Zhuo et al.

(10) Patent No.: US 12,149,983 B2
(45) Date of Patent: Nov. 19, 2024

(54) DOWNLINK BUFFER STATUS FEEDBACK METHOD AND APPARATUS

(71) Applicant: HUAWEI TECHNOLOGIES CO., LTD., Guangdong (CN)

(72) Inventors: Yibin Zhuo, Shenzhen (CN); Zhenzhen Cao, Beijing (CN); Mingzeng Dai, Shenzhen (CN); Yuanping Zhu, Shanghai (CN); Jing Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 574 days.

(21) Appl. No.: 17/400,889

(22) Filed: Aug. 12, 2021

(65) Prior Publication Data

US 2021/0377787 A1     Dec. 2, 2021

Related U.S. Application Data

(63) Continuation of application No. PCT/CN2020/075311, filed on Feb. 14, 2020.

(30) Foreign Application Priority Data

Feb. 15, 2019  (CN) .......................... 201910117920.4

(51) Int. Cl.
*H04W 28/02*     (2009.01)
*H04B 7/155*     (2006.01)
(Continued)

(52) U.S. Cl.
CPC ....... *H04W 28/0278* (2013.01); *H04W 72/21* (2023.01); *H04W 72/23* (2023.01); *H04B 7/15528* (2013.01)

(58) Field of Classification Search
CPC . H04W 28/0278; H04W 72/21; H04W 72/23; H04B 7/15528
See application file for complete search history.

(56) References Cited

U.S. PATENT DOCUMENTS

2013/0010705 A1   1/2013   Jonsson et al.
2015/0043423 A1   2/2015   Hadef et al.
(Continued)

FOREIGN PATENT DOCUMENTS

CN    101267365 A    9/2008
CN    102450045 A    5/2012
(Continued)

OTHER PUBLICATIONS

U.S. Appl. No. 62/716,022 (Year: 2018).*
(Continued)

*Primary Examiner* — Basil Ma
(74) *Attorney, Agent, or Firm* — Fish & Richardson P.C.

(57) ABSTRACT

The present disclosure discloses example downlink buffer status feedback methods and apparatuses. One example method includes determining first information by a first node, where the first information indicates a downlink buffer status of a first bearer between the first node and a parent node of the first node. The first information is sent by the first node to a second node, where the first node is a relay node in a wireless relay communications system, and the second node is a parent node of the first node.

17 Claims, 12 Drawing Sheets

(51) Int. Cl.
  *H04W 72/21* (2023.01)
  *H04W 72/23* (2023.01)

(56) References Cited

U.S. PATENT DOCUMENTS

| | | | | |
|---|---|---|---|---|
| 2021/0168758 | A1* | 6/2021 | Luo | H04W 80/02 |
| 2021/0211928 | A1* | 7/2021 | Narasimha | H04W 88/14 |
| 2021/0211939 | A1* | 7/2021 | Teyeb | H04W 40/24 |

FOREIGN PATENT DOCUMENTS

| | | |
|---|---|---|
| CN | 102835069 A | 12/2012 |
| CN | 103098507 A | 5/2013 |
| EP | 2425653 B1 | 1/2018 |
| WO | 2018175817 A1 | 9/2018 |

OTHER PUBLICATIONS

3GPP TS 38.300 V15.4.0 (Dec. 2018), "3rd Generation Partnership Project; Technical Specification Group Radio Access Network;NR; NR and NG-RAN Overall Description;Stage 2(Release 15)," Dec. 2018, 97 pages.

3GPP TS 38.321 V15.4.0 (Dec. 2018), "3rd Generation Partnership Project; Technical Specification Group Radio Access Network;NR;Medium Access Control (MAC) protocol specification(Release 15)," Dec. 2018, 77 pages.

Huawei, "Some considerations about congestion handling and flow control for IAB networks," 3GPP TSG-RAN WG2#103, R2-1812711, Gothenburg, Sweden, Aug. 20-24, 2018, 5 pages.

Huawei, HiSilicon, "Pre-BSR Enabling Fast Scheduling," 3GPP TSG-RAN WG2 Meeting AH-1807, R2-1810700, Montreal, Canada, May 2-6, 2018, 2 pages.

LG Electronics Inc., "Flow control in IAB node," 3GPP TSG-RAN WG2 NR Ad Hoc #4, R2-1810432, Montreal, Canada, Jul. 2-6, 2018, 2 pages.

Office Action issued in Chinese Application No. 201910117920.4 on Apr. 2, 2021, 14 pages (with English translation).

PCT International Search Report and Written Opinion issued in International Application No. PCT/CN2020/075311 on May 15, 2020, 17 pages (with English translation).

ASUSTeK, "Discussion on SR/BSR triggering in multi-hop IAB network," 3GPP TSG-RAN WG2 Meeting #105, R2-1901030, Athens, Greece, Feb. 25-Mar. 1, 2019, 4 pages.

Ericsson, "LCID and LCG Extension for IAB Nodes," 3GPP TSG-RAN WG2 Meeting #105, R2-1901329, Athens, Greece, Feb. 25-Mar. 1, 2019, 6 pages.

Ericsson et al., "Logical Channel Grouping for BSR in IAB Networks," 3GPP TSG-RAN WG2 Meeting #103b, R2-1814363, Chengdu, P.R. China, Oct. 8-12, 2018, 3 pages.

Extended European Search Report issued in European Application No. 20755248.0 on Mar. 9, 2022, 12 pages.

Office Action in Indian Appln. No. 202127039189, mailed on Jun. 12, 2024, 3 pages (with English translation).

* cited by examiner

DOWNLINK BUFFER STATUS FEEDBACK METHOD AND APPARATUS

CROSS-REFERENCE TO RELATED APPLICATIONS

This application is a continuation of International Application No. PCT/CN2020/075311, filed on Feb. 14, 2020, which claims priority to Chinese Patent Application No. 201910117920.4, filed on Feb. 15, 2019. The disclosures of the aforementioned applications are hereby incorporated by reference in their entireties.

TECHNICAL FIELD

Embodiments of this application relate to the field of communications technologies, and in particular, to a downlink buffer status feedback method and an apparatus.

BACKGROUND

With development of communications technologies, a relay networking technology is widely used and developed. A relay networking architecture is provided in the relay networking technology. The relay networking architecture includes a donor gNodeB (DgNB), one or more relay nodes, and one or more terminals. The relay node is directly connected to the donor gNodeB or indirectly connected to the donor gNodeB by using another relay node, and the terminal is connected to the donor gNodeB or the relay node through a radio air interface. In the relay networking architecture, a wireless link between the terminal and the relay node may be referred to as a wireless access link (AL). A wireless link between the relay nodes or between the relay node and the DgNB may be referred to as a wireless backhaul link (BL).

In a 5G-oriented wireless relay networking architecture, both a multi-hop wireless relay scenario and a multi-connectivity scenario can be supported. In a multi-hop/multi-connectivity integrated access and backhaul (IAB) networking scenario, data of a terminal may be usually transmitted, through a wireless access link, to an IAB node accessed by the terminal, so that the IAB node transmits the data to an upper-level node or a donor gNodeB.

In a downlink multi-hop scenario in the IAB scenario, downlink data transmission for each hop is completed through scheduling performed by an IAB node. To be specific, a base station (or a distributed unit (DU)) in each IAB node schedules a mobile terminal (MT) in a child node to implement downlink data transmission. For example, an IAB node 1 schedules an MT in a child node, namely, an IAB node 2, of the IAB node 1 to perform downlink data transmission.

In the IAB scenario, when congestion occurs in a downstream direction of a wireless backhaul link for a hop, because an IAB node cannot sense a buffer status of downlink data of the IAB node, downlink data sent by a base station (or a DU) in the IAB node on a downlink encounters congestion, and a packet drop may occur.

SUMMARY

Embodiments of this application provide a downlink buffer status feedback method and an apparatus, to effectively avoid downlink congestion caused by a factor such as link interruption in an IAB scenario, and prevent a downlink data packet drop.

To achieve the foregoing objective, the following technical solutions are used in the embodiments of this application.

According to a first aspect, an embodiment of this application provides a downlink buffer status feedback method. The method includes: A first node determines first information. The first information is used to indicate a downlink buffer status of a first bearer between the first node and a parent node of the first node. The first node sends the first information to a second node. The first node is a relay node in a wireless relay communications system, and the second node is a donor node in the wireless relay communications system or a parent node of the first node.

According to the downlink buffer status feedback method provided in this embodiment of this application, the first node determines the first information. The first information is used to reflect the downlink buffer status of the first bearer between the first node and the parent node of the first node. Therefore, the first node sends the first information to the second node, so that the second node can adjust, in a timely manner based on the downlink buffer status of the first bearer, a transmission rate of downlink data transmitted to the first node, to prevent downlink data congestion at the first node, effectively avoid downlink congestion caused by a factor such as link interruption in an IAB scenario, and prevent an unnecessary downlink data packet drop.

In a possible implementation, the first information includes identification information of the first bearer. In this way, the second node can determine that downlink data transmitted on the first bearer in a plurality of bearers on a wireless backhaul link between the first node and the parent node of the first node encounters congestion or is about to encounter congestion at the first node, so that the second node can control a transmission rate of downlink data sent to the first node.

In a possible implementation, the first information further includes a downlink buffer size of the first bearer. The downlink buffer size is sent, so that the second node can determine a downlink buffer status of the first node based on the downlink buffer size.

In a possible implementation, the downlink buffer size may include any one or more of the following information: a remaining downlink buffer size, a downlink buffer occupancy ratio, an expected downlink transmission rate, a congestion level, and a downlink buffer size combination; and the downlink buffer size combination includes a total downlink buffer size and a current downlink buffer size.

In a possible implementation, that the first node sends the first information to a second node includes: The first node sends the first information to the second node when the downlink buffer size of the first bearer exceeds a first threshold.

In a possible implementation, the downlink buffer status includes a downlink buffer status of a third node on the first bearer, and the third node is a target node for downlink data transmitted on the first bearer.

In a possible implementation, the first information includes identification information of the first bearer and identification information of the third node. In this way, it is convenient to indicate that data to be sent to the third node on the first bearer encounters congestion or is about to encounter congestion at the first node. Therefore, the second node needs to reduce a transmission rate of the downlink data to be sent to the third node by using the first bearer or stop sending the downlink data to the third node by using the first bearer.

In a possible implementation, the first information further includes a downlink buffer size of the third node on the first bearer. In this way, the second node can determine that data to be sent to the third node on the first bearer encounters congestion or is about to encounter congestion at the first node.

In a possible implementation, the downlink buffer size of the third node on the first bearer includes any one or more of the following information: a remaining downlink buffer size of the third node, a downlink buffer occupancy ratio of the third node, an expected downlink transmission rate, a congestion level of the third node, and a downlink buffer size combination of the third node; and the downlink buffer size combination of the third node includes a total downlink buffer size of the third node and a current downlink buffer size of the third node.

In a possible implementation, that the first node sends the first information to a second node includes: The first node sends the first information to the second node when the downlink buffer size of the third node on the first bearer exceeds a second threshold. In this way, the first node can send the first information when determining that the downlink buffer size of the third node encounters congestion on the first bearer.

In a possible implementation, the downlink buffer status includes a downlink buffer status of the third node at the first node. In this way, the second node can control a transmission rate of downlink data sent by the first node to the third node.

In a possible implementation, the method provided in this embodiment of this application further includes: The first node receives second information from the second node. The second information is used to request the first information. The first node can determine, by using the second information, that the first information needs to be reported to the second node.

In a possible implementation, that the first node sends the first information to a second node includes: A mobile terminal MT in the first node sends the first information to a DU in the second node by using media access control MAC layer signaling or adaptation layer signaling.

In a possible implementation, the method provided in this embodiment of this application further includes: The first node sends third information to the parent node of the first node. The third information includes identification information of the second node. Alternatively, the third information includes flow control type indication information. When the second node is the parent node of the first node, the flow control type indication information indicates that a target receiving node of the first information is the parent node of the first node. Alternatively, when the second node is the donor node, the flow control type indication information indicates that a target receiving node of the first information is the donor node. Optionally, the third information may be included in the first information. A same flow control feedback format supports both hop-by-hop flow control and end-to-end flow control by identifying the flow control type indication information or identifying the identification information of the second node.

In an optional implementation, when the second node is the donor node, that the first node sends the first information to a second node further includes: A distributed unit DU in the first node sends the first information to a centralized unit CU in the donor node through an F1 interface.

In an optional implementation, when the second node is the donor node, that the first node sends the first information to a second node further includes: An MT in the first node sends the first information to a CU in the donor node by using radio resource control RRC signaling.

According to a second aspect, an embodiment of this application provides a downlink buffer status feedback method. The method includes: A second node receives first information from a first node. The first information is used to indicate a downlink buffer status of a first bearer between the first node and a parent node of the first node. The first node is a relay node in a wireless relay communications system, and the second node is a donor node in the wireless relay communications system or a parent node of the first node.

In an optional implementation, the first information includes identification information of the first bearer.

In an optional implementation, the first information further includes a downlink buffer size of the first bearer.

In an optional implementation, the downlink buffer status includes a downlink buffer status of a third node on the first bearer, and the third node is a target node for downlink data transmitted on the first bearer.

In an optional implementation, the first information includes identification information of the first bearer and identification information of the third node.

In an optional implementation, the first information further includes a downlink buffer size of the third node on the first bearer.

In an optional implementation, the method provided in this embodiment of this application further includes: The second node sends, to the first node, second information used to request the first information.

In an optional implementation, that a second node receives first information from a first node includes: The second node receives media access control MAC layer signaling or adaptation layer signaling from a mobile terminal MT in the first node. The MAC layer signaling or the adaptation layer signaling carries the first information.

In an optional implementation, the method provided in this embodiment of this application further includes: The second node receives third information from the first node. The third information includes identification information of the second node or flow control type indication information. When the second node is the parent node of the first node, the flow control type indication information indicates that a target receiving node of the first information is the parent node of the first node. Alternatively, when the second node is the donor node, the flow control type indication information indicates that a target receiving node of the first information is the donor node.

In an optional implementation, when the second node is the donor node, that a second node receives first information from a first node further includes: A centralized unit CU in the second node receives the first information sent by a distributed unit DU in the first node through an F1 interface.

In an optional implementation, when the second node is the donor node, that a second node receives first information from a first node further includes: A CU in the second node receives radio resource control RRC signaling from an MT in the first node. The RRC signaling includes the first information.

In an optional implementation, when the second node is the parent node of the first node, the method further includes: The second node receives identification information of the second node or flow control type indication information from the first node. The flow control type indication information indicates that a target receiving node of the first information is the parent node of the first node; or the flow control type indication information indicates that a target receiving node of the first information is the donor node.

In an optional implementation, the method provided in this embodiment of this application further includes: The second node controls, based on the first information, a transmission rate of downlink data transmitted to the first node.

In an optional implementation, that the second node controls, based on the first information, a transmission rate of downlink data transmitted to the first node includes: The second node reduces the transmission rate of the downlink data transmitted to the first node or stops the transmission of the downlink data transmitted to the first node.

According to a third aspect, an embodiment of this application provides a communications apparatus. The communications apparatus may be a first node, or may be a chip in the first node. The communications apparatus may include a processing unit and a transceiver unit. When the communications apparatus is the first node, the processing unit may be a processor, and the transceiver unit may be a transceiver. The first node may further include a storage unit, and the storage unit may be a memory. The storage unit is configured to store instructions, and the processing unit executes the instructions stored in the storage unit, so that the first node implements the downlink buffer status feedback method according to any one of the first aspect or the possible implementations of the first aspect. When the communications apparatus is the chip in the first node, the processing unit may be a processor, and the transceiver unit may be a communications interface. For example, the communications interface may be an input/output interface, a pin, a circuit, or the like. The processing unit executes instructions stored in a storage unit, so that the first node implements the downlink buffer status feedback method according to any one of the first aspect or the possible implementations of the first aspect. The storage unit may be a storage unit (for example, a register or a cache) in the chip, or may be a storage unit (for example, a read-only memory or a random access memory) that is in the first node but located outside the chip.

According to a fourth aspect, an embodiment of this application provides a communications apparatus. The communications apparatus may be a second node, or may be a chip in the second node. The communications apparatus may include a processing unit and a transceiver unit. When the communications apparatus is the second node, the processing unit may be a processor, and the transceiver unit may be a transceiver. The second node may further include a storage unit, and the storage unit may be a memory. The storage unit is configured to store instructions, and the processing unit executes the instructions stored in the storage unit, so that the second node implements the downlink buffer status feedback method according to any one of the second aspect or the possible implementations of the second aspect. When the communications apparatus is the chip in the second node, the processing unit may be a processor, and the transceiver unit may be a communications interface. For example, the communications interface may be an input/output interface, a pin, a circuit, or the like. The processing unit executes instructions stored in a storage unit, so that the second node implements the downlink buffer status feedback method according to any one of the second aspect or the possible implementations of the second aspect. The storage unit may be a storage unit (for example, a register or a cache) in the chip, or may be a storage unit (for example, a read-only memory or a random access memory) that is in the second node but located outside the chip.

According to a fifth aspect, an embodiment of this application provides a computer readable storage medium. The computer readable storage medium stores a computer program or instructions. When the computer program or the instructions are run on a computer, the computer is enabled to perform the downlink buffer status feedback method according to any one of the first aspect or the possible implementations of the first aspect.

According to a sixth aspect, an embodiment of this application provides a computer readable storage medium. The computer readable storage medium stores a computer program or instructions. When the computer program or the instructions are run on a computer, the computer is enabled to perform the downlink buffer status feedback method according to any one of the second aspect or the possible implementations of the second aspect.

According to a seventh aspect, an embodiment of this application provides a computer program product including instructions. When the instructions are run on a computer, the computer is enabled to perform the downlink buffer status feedback method according to the first aspect or the possible implementations of the first aspect.

According to an eighth aspect, this application provides a computer program product including instructions. When the instructions are run on a computer, the computer is enabled to perform the downlink buffer status feedback method according to the second aspect or the possible implementations of the second aspect.

According to a ninth aspect, an embodiment of this application provides a communications system. The communications system includes any one or more of the following: the first node according to the third aspect and the possible implementations, and the second node according to the fourth aspect and the possible implementations of the fourth aspect.

In an optional implementation, the communications system may further include a terminal. The terminal accesses the communications system by using a third node.

In an optional implementation, when the second node is not a donor node, the communications system may further include a donor node.

According to a tenth aspect, an embodiment of this application provides a communications apparatus. The communications apparatus includes a processor and a storage medium, and the storage medium stores instructions. The instructions are run by the processor, to implement the downlink buffer status feedback method according to the first aspect or the possible implementations of the first aspect.

According to an eleventh aspect, an embodiment of this application provides a communications apparatus. The communications apparatus includes a processor and a storage medium, and the storage medium stores instructions. The instructions are run by the processor, to implement the downlink buffer status feedback method according to the second aspect or the possible implementations of the second aspect.

According to a twelfth aspect, an embodiment of this application provides a communications apparatus. The communications apparatus includes one or more modules, configured to implement the methods according to the first aspect and the second aspect, and the one or more modules may correspond to the steps in the methods according to the first aspect and the second aspect.

According to a thirteenth aspect, an embodiment of this application provides a chip. The chip includes a processor and a communications interface. The communications interface is coupled to the processor. The processor is configured to run a computer program or instructions, to implement the downlink buffer status feedback method according to the first aspect or the possible implementations of the first aspect. The communications interface is configured to communicate with a module other than the chip.

According to a fourteenth aspect, an embodiment of this application provides a chip. The chip includes a processor and a communications interface. The communications interface is coupled to the processor. The processor is configured to run a computer program or instructions, to implement the downlink buffer status feedback method according to the second aspect or the possible implementations of the second aspect. The communications interface is configured to communicate with a module other than the chip.

Specifically, the chip provided in this embodiment of this application further includes a memory, configured to store the computer program or the instructions.

According to a fifteenth aspect, an embodiment of this application provides a downlink buffer status feedback method, including: A first node determines first information. The first information includes one or more of identification information of a third node and a downlink buffer size of the third node. The first node sends the first information to a second node. The first node is a relay node in a wireless relay communications system, and the second node is a parent node of the first node.

In a possible implementation, the downlink buffer size of the third node includes one or more of the following: a remaining downlink buffer size of the third node, a downlink buffer occupancy ratio of the third node, a third expected downlink transmission rate, a congestion level of the third node, or a downlink buffer size combination of the third node; and the downlink buffer size combination of the third node includes a total downlink buffer size of the third node and a current downlink buffer size of the third node.

In a possible implementation, that the first node sends the first information to a second node includes: The first node sends the first information to the second node when a downlink buffer size of data of the third node exceeds a second threshold at the first node.

In a possible implementation, the method provided in this embodiment of this application further includes: The first node receives second information from the second node. The second information is used to request the first information.

In a possible implementation, the third node is an IAB node accessed by a terminal.

In a possible implementation, the first information is carried in media access control MAC layer signaling or adaptation layer signaling.

In a possible implementation, that the first node sends the first information to a second node includes: A mobile terminal MT in the first node sends the MAC layer signaling or the adaptation layer signaling to a DU in the second node.

In a possible implementation, the method provided in this embodiment of this application includes: The second node receives the first information from the first node. The first information includes one or more of identification information of a third node and a downlink buffer size of the third node. The first node is a relay node in a wireless relay communications system, and the second node is a parent node of the first node.

In a possible implementation, the downlink buffer size of the third node includes one or more of the following: a remaining downlink buffer size of the third node, a downlink buffer occupancy ratio of the third node, a third expected downlink transmission rate, a congestion level of the third node, or a downlink buffer size combination of the third node; and the downlink buffer size combination of the third node includes a total downlink buffer size of the third node and a current downlink buffer size of the third node.

In a possible implementation, that the first node sends the first information to a second node includes: The first node sends the first information to the second node when a downlink buffer size of data of the third node exceeds a second threshold at the first node.

In a possible implementation, the method provided in this embodiment of this application further includes: The second node sends second information to the first node. The second information is used to request the first information.

In a possible implementation, the third node is an IAB node accessed by a terminal.

In a possible implementation, the first information is carried in media access control MAC layer signaling or adaptation layer signaling.

In a possible implementation, that the first node sends the first information to a second node includes:

A mobile terminal MT in the first node sends the MAC layer signaling or the adaptation layer signaling to a DU in the second node.

According to a sixteenth aspect, an embodiment of this application provides a downlink buffer status feedback method, including: A second node receives first information from a first node. The first information includes one or more of identification information of a third node and a downlink buffer size of the third node. The first node is a relay node in a wireless relay communications system, and the second node is a parent node of the first node.

In a possible implementation, the downlink buffer size of the third node includes one or more of the following: a remaining downlink buffer size of the third node, a downlink buffer occupancy ratio of the third node, a third expected downlink transmission rate, a congestion level of the third node, or a downlink buffer size combination of the third node; and the downlink buffer size combination of the third node includes a total downlink buffer size of the third node and a current downlink buffer size of the third node.

In a possible implementation, the method provided in this embodiment of this application further includes: The second node sends second information to the first node. The second information is used to request the first information.

In a possible implementation, the third node is an IAB node accessed by a terminal.

In a possible implementation, the first information is carried in media access control MAC layer signaling or adaptation layer signaling.

In a possible implementation, that a second node receives first information from a first node includes: A DU in the second node receives the MAC layer signaling or the adaptation layer signaling from a mobile terminal MT in the first node.

According to a seventeenth aspect, an embodiment of this application provides a communications apparatus. The communications apparatus may be a first node, or may be a chip in the first node. The communications apparatus may include a processing unit and a transceiver unit. When the communications apparatus is the first node, the processing unit may be a processor, and the transceiver unit may be a transceiver. The first node may further include a storage unit, and the storage unit may be a memory. The storage unit is configured to store instructions, and the processing unit executes the instructions stored in the storage unit, so that the first node implements the downlink buffer status feedback method according to any one of the fifteenth aspect or the possible implementations of the fifteenth aspect. When the communications apparatus is the chip in the first node, the processing unit may be a processor, and the transceiver unit may be a communications interface. For example, the communications interface may be an input/output interface, a pin, a circuit, or the like. The processing unit executes instructions stored in a storage unit, so that the first node implements the downlink buffer status feedback method according to any one of the fifteenth aspect or the possible implementations of the fifteenth aspect. The storage unit may be a storage unit (for example, a register or a cache) in the chip, or may be a storage unit (for example, a read-only memory or a random access memory) that is in the first node but located outside the chip.

According to an eighteenth aspect, an embodiment of this application provides a communications apparatus. The communications apparatus may be a second node, or may be a chip in the second node. The communications apparatus may include a processing unit and a transceiver unit. When the communications apparatus is the second node, the processing unit may be a processor, and the transceiver unit may be a transceiver. The second node may further include a storage unit, and the storage unit may be a memory. The storage unit is configured to store instructions, and the processing unit executes the instructions stored in the storage unit, so that the second node implements the downlink buffer status feedback method according to any one of the sixteenth aspect or the possible implementations of the sixteenth aspect. When the communications apparatus is the chip in the second node, the processing unit may be a processor, and the transceiver unit may be a communications interface. For example, the communications interface may be an input/output interface, a pin, a circuit, or the like. The processing unit executes instructions stored in a storage unit, so that the second node implements the downlink buffer status feedback method according to any one of the sixteenth aspect or the possible implementations of the sixteenth aspect. The storage unit may be a storage unit (for example, a register or a cache) in the chip, or may be a storage unit (for example, a read-only memory or a random access memory) that is in the second node but located outside the chip.

According to a nineteenth aspect, an embodiment of this application provides a computer readable storage medium. The computer readable storage medium stores a computer program or instructions. When the computer program or the instructions are run on a computer, the computer is enabled to perform the downlink buffer status feedback method according to any one of the fifteenth aspect or the possible implementations of the fifteenth aspect.

According to a twentieth aspect, an embodiment of this application provides a computer readable storage medium. The computer readable storage medium stores a computer program or instructions. When the computer program or the instructions are run on a computer, the computer is enabled to perform the downlink buffer status feedback method according to any one of the sixteenth aspect or the possible implementations of the sixteenth aspect.

According to a twenty-first aspect, an embodiment of this application provides a computer program product including instructions. When the instructions are run on a computer, the computer is enabled to perform the downlink buffer status feedback method according to the fifteenth aspect or the possible implementations of the fifteenth aspect.

According to a twenty-second aspect, this application provides a computer program product including instructions. When the instructions are run on a computer, the computer is enabled to perform the downlink buffer status feedback method according to the sixteenth aspect or the possible implementations of the sixteenth aspect.

According to a twenty-third aspect, an embodiment of this application provides a communications system. The communications system includes any one or more of the following: the first node according to the seventeenth aspect and the possible implementations, and the second node according to the eighteenth aspect and the possible implementations of the eighteenth aspect.

In an optional implementation, the communications system may further include a terminal. The terminal accesses the communications system by using a third node.

In an optional implementation, when the second node is not a donor node, the communications system may further include a donor node.

According to a twenty-fourth aspect, an embodiment of this application provides a communications apparatus. The communications apparatus includes a processor and a storage medium, and the storage medium stores instructions. The instructions are run by the processor, to implement the downlink buffer status feedback method according to the fifteenth aspect or the possible implementations of the fifteenth aspect.

According to a twenty-fifth aspect, an embodiment of this application provides a communications apparatus. The communications apparatus includes a processor and a storage medium, and the storage medium stores instructions. The instructions are run by the processor, to implement the downlink buffer status feedback method according to the sixteenth aspect or the possible implementations of the sixteenth aspect.

According to a twenty-sixth aspect, an embodiment of this application provides a communications apparatus. The communications apparatus includes one or more modules, configured to implement the methods according to the fifteenth aspect and the sixteenth aspect, and the one or more modules may correspond to the steps in the methods according to the fifteenth aspect and the sixteenth aspect.

According to a twenty-seventh aspect, an embodiment of this application provides a chip. The chip includes a processor and a communications interface. The communications interface is coupled to the processor. The processor is configured to run a computer program or instructions, to implement the downlink buffer status feedback method according to the fifteenth aspect or the possible implementations of the fifteenth aspect. The communications interface is configured to communicate with a module other than the chip.

According to a twenty-eighth aspect, an embodiment of this application provides a chip. The chip includes a processor and a communications interface. The communications interface is coupled to the processor. The processor is configured to run a computer program or instructions, to implement the downlink buffer status feedback method according to the sixteenth aspect or the possible implementations of the sixteenth aspect. The communications interface is configured to communicate with a module other than the chip.

Specifically, the chip provided in this embodiment of this application further includes a memory, configured to store the computer program or the instructions.

Any apparatus, computer storage medium, computer program product, chip, or communications system provided above is configured to perform the corresponding method provided above. Therefore, for beneficial effects that can be achieved by the apparatus, computer storage medium, computer program product, chip, or communications system, refer to beneficial effects of a corresponding solution in the corresponding method provided above. Details are not described herein again.

DESCRIPTION OF EMBODIMENTS

Figure 1:
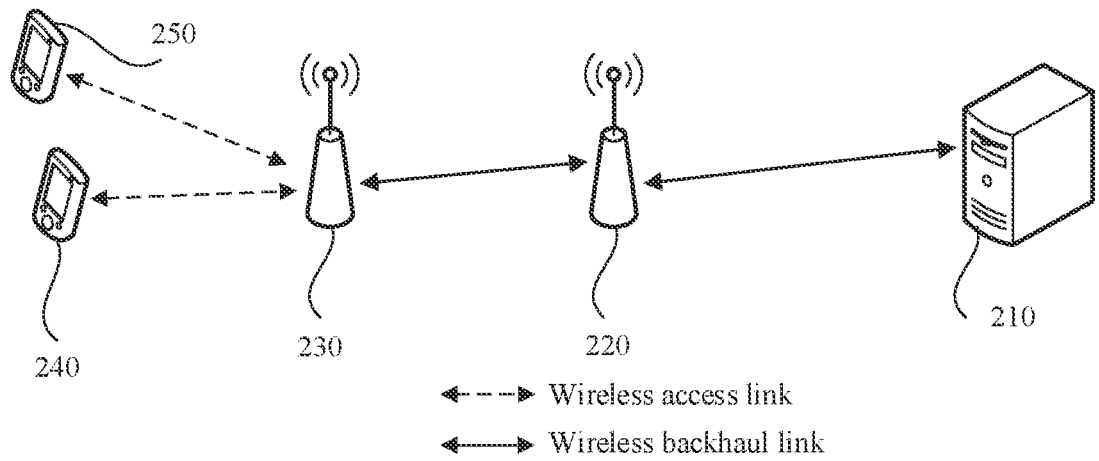
FIG. 1 to FIG. 12 each are a schematic structural diagram of a wireless relay communications system according to an embodiment of this application.

To clearly describe the technical solutions in the embodiments of this application, terms such as "first" and "second" are used in the embodiments of this application to distinguish between same items or similar items that have basically same functions and purposes. For example, first information and second information are merely used to distinguish between different information, and do not limit sequences of the first information and the second information. A person skilled in the art may understand that the terms such as "first" and "second" do not limit a quantity or an execution sequence, and the terms such as "first" and "second" do not indicate a definite difference.

It should be noted that in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a related concept in a specific manner.

In this application, "at least one" refers to one or more, and "a plurality of" refers to two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following" or a similar expression thereof indicates any combination of the following, including any combination of one or more of the following. For example, at least one of a, b, or c may indicate: a, b, c, a and b, a and c, b and c, or a, b, and c, where a, b, and c may be singular or plural.

The following describes technical solutions in this application with reference to the accompanying drawings.

It should be understood that names of all nodes and messages in this application are merely names specified for ease of description in this application, and may be different names in an actual network. It should not be understood that names of various nodes and messages are limited in this application. On the contrary, any name that has a same or similar function as that of a node or a message used in this application is considered as a method or an equivalent replacement in this application, and is within the protection scope of this application. Details are not described below.

The technical solutions in the embodiments of this application may be applied to various communications systems for data processing, for example, a code division multiple access (CDMA) system, a time division multiple access (TDMA) system, a frequency division multiple access (DMA) system, an orthogonal frequency division multiple access (OFDMA) system, a single carrier frequency division multiple access (single carrier FDMA, SC-FDMA) system, and another system. The terms "system" and "network" can be interchanged with each other. The CDMA system can implement wireless technologies such as universal terrestrial radio access (UTRA) and CDMA2000. The UTRA may include a wideband CDMA (WCDMA) technology and other variant technologies of CDMA. CDMA2000 may cover the interim standard (IS) 2000 (IS-2000), the IS-95 standard, and the S-856 standard. The TDMA system can implement wireless technologies such as a global system for mobile communications (GSM). The OFDMA system can implement wireless technologies such as evolved universal terrestrial radio access (evolved UTRA, E-UTRA), ultra mobile broadband (UMB), IEEE 802.11 (Wi-Fi), IEEE 802.16 (WiMAX), IEEE 802.20, and Flash OFDMA. The UTRA corresponds to a UMTS, and the E-UTRA corresponds to an evolved version of the UMTS. 3GPP long term evolution (LTE) and various versions evolved based on LTE are redactions using E-UTRA UMTS. A 5G communications system or new radio (NR) is a next generation communications system under research. In addition, the communications system is further applicable to a future-oriented communications technology, and is applicable to the technical solutions provided in the embodiments of this application.

A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of a network architecture and emergence of a new service scenario, the technical solutions provided in the embodiments of this application are also applicable to similar technical problems. In the embodiments of this application, an example in which a method provided in the embodiments of this application is applied to an NR system or a 5G network is used for description. However, it should be noted that the method provided in the embodiments of this application may also be applied to another network, for example, may be applied to an evolved packet system (EPS for short) network (namely, a 4th generation (4G for short) network). Correspondingly, when the method provided in the embodiments of this application is applied to the EPS network, a network node performing the method provided in the embodiments of this application is replaced with a network node in the EPS network. For example, when the method provided in the embodiments of this application is applied to the 5G network or the NR system, a node in the following descriptions may be a wireless backhaul node in the 5G network. For example, the wireless backhaul node in the 5G network may be referred to as an IAB node, and certainly may have another name. This is not specifically limited in the embodiments of this application. When the method provided in the embodiments of this application is applied to the EPS network, a wireless backhaul node in the following descriptions may be a wireless backhaul node in the EPS network. For example, the wireless backhaul node in the EPS network may be referred to as a relay node (RN for short).

Compared with a 4th generation mobile communications system, a 5th generation (5G) mobile communications system has stricter requirements on various network performance indicators in an all-round manner. For example, a capacity is increased by 1000 times, wider coverage is required, and ultra-high reliability and ultra-low latency are required. Considering abundant frequency resources on high-frequency carriers, high-frequency small cell networking is increasingly popular in hotspot areas to meet ultra-high capacity requirements in 5G. The high-frequency carrier has a relatively poor propagation characteristic, is severely attenuated due to blocking, and has a small coverage area. As a result, a large quantity of small cells need to be densely deployed. Correspondingly, it is costly and difficult to provide fiber backhaul for these densely deployed small cells. Therefore, an economical and convenient backhaul solution is required. In addition, to meet a wide coverage requirement, network coverage needs to be provided in some remote areas, but fiber deployment is difficult and costly. Therefore, a flexible and convenient access and backhaul solution also needs to be designed.

To further reduce deployment costs and improve deployment flexibility, an integrated access and backhaul (IAB) technology is introduced in 5G. A wireless transmission solution is used for both an access link AL) and a backhaul link (BL), so that optical fiber deployment is not required. For ease of description, a wireless access link and a wireless backhaul link are used as examples below.

In the embodiments of this application, a node that supports integrated access and backhaul may be referred to as a wireless backhaul node, and the wireless backhaul node may also be referred to as a relay node (RN), an IAB node, or a radio access network device. For ease of description, the IAB node is used as an example below for description. The IAB node may provide a wireless access service for a terminal. Data of the terminal is transmitted to the IAB node through a wireless access link, and then transmitted by the IAB node to a donor node through a wireless backhaul link, where the IAB node is connected to the donor node. The donor node is also referred to as an IAB donor or a donor base station. In a 4G network, the donor node may be a donor evolved NodeB (Donor eNodeB, DeNB). In a 5G network, the donor node may be a donor next-generation NodeB (Donor gNodeB, DgNB).

For example, the donor node may be an access network element having a complete base station function, or may be an access network element in a form in which a centralized unit (CU) and a distributed unit (DU) are separated. The donor node is connected, through a wireless link or a wired link, to a core network element that serves the terminal, for example, is connected to a network element in a 5G core (5GC) network or a 4G core network, and provides a wireless backhaul function for the IAB node.

The IAB node in the embodiments of this application may exist in two forms. In one form, the IAB node exists as an independent access node, and may independently manage a terminal that accesses the IAB node. In this case, the IAB node usually has an independent physical cell identifier (PCI). The IAB node in this form usually needs to have a complete protocol stack function, for example, a radio resource control (RRC) function. The IAB node is usually referred to as a layer 3 relay. The IAB node in the other form belongs to a same cell as a donor node, such as a donor eNB or a donor gNB. A user is managed by a donor, such as a donor node. The IAB node is usually referred to as a layer 2 relay. The layer 2 relay usually exists as a DU of a base station DgNB in an NR-based control and bearer separation (central unit and Distributed unit, CU-DU) architecture, and communicates with a CU through an F1-AP (F1 application protocol) interface or by using a tunneling protocol. For example, the tunneling protocol may be GTP (general packet radio service tunneling protocol). Details are not described. The donor node is a node that may access a core network through the node, or is an anchor base station in a radio access network. The donor node may access a network through the anchor base station. The anchor base station is responsible for receiving data from the core network and forwarding the data to a relay node, or receiving data from a relay node and forwarding the data to the core network. A donor node in a relay system is usually referred to as an IAB donor, namely, a donor node or a donor base station. In this application, the two terms may be alternately used. It should not be understood that the IAB donor and the donor node are entities or network elements having different functions.

One IAB node may include a function of a DU and a function of a mobile terminal (MT). The function of the MT is mainly similar to a function of a mobile terminal, and terminates a radio interface layer of a Uu interface on a backhaul link to a donor node or another IAB node. The DU mainly provides an access function for a terminal or a node served by the IAB node, namely, a function of a Uu interface. For example, the DU may provide a wireless connection function for an NR terminal or child node. The DU may be connected to the IAB donor through an F1* interface. F1* is an optimized or modified F1 interface, and the F1 interface is an interface between the DU and the CU. As described above, an IAB node is connected to a parent node through the Uu interface. Therefore, one IAB node is connected to a DU in a parent node (for example, another IAB node) by using an MT in the IAB node, and may be connected to the parent node by using a radio link control (RLC) layer/an adaptation (Adapt) layer.

When the IAB node communicates with a parent node of the IAB node, the IAB node may be considered as a terminal, namely, play a role of the MT. When the IAB node communicates with a child node (the child node may be another IAB node, or a terminal that accesses the IAB node) of the IAB node, the IAB node may be considered as a network device, namely, play a role of the DU. For ease of description, a centralized unit in the donor node is briefly referred to as a donor CU (or directly referred to as a CU), and a distributed unit in the donor node is briefly referred to as a donor DU. The donor CU may alternatively be in a form in which a control plane (CP) and a user plane (UP) are separated, for example, the CU may include one CU-CP and one (or more) CU-UPs.

In a current 5G standard, considering that a high frequency band has a small coverage area, to ensure coverage performance of a network, multi-hop networking may be used in an IAB network. In consideration of a service transmission reliability requirement, the IAB node may be enabled to support multi-connectivity, to cope with an exception that may occur on a backhaul link, for example, an exception such as link interruption or blockage and load fluctuation, thereby improving transmission reliability. The multi-connectivity may be specifically dual connectivity (DC), or may be more than two connections. This is not limited in this embodiment of this application.

The IAB network supports multi-hop networking and multi-connectivity networking. Therefore, there may be a plurality of transmission paths between a terminal and a donor base station. On one path, there is a determined hierarchical relationship between IAB nodes and between an IAB node and a donor base station that provides a service for the IAB node. In the embodiments of this application, each IAB node considers a node that provides a radio access and backhaul service for the IAB node as a parent node. Correspondingly, each IAB node may be considered as a child node relative to a parent node of the IAB node. In other words, a parent node of one IAB node is a next-hop node of the IAB node on an uplink or a previous-hop node of the IAB node on a downlink, and a child node of one IAB node is a previous-hop node of the IAB node on an uplink or a next-hop node of the IAB node on a downlink. Therefore, in the embodiments of this application, from a perspective of downlink transmission, a parent node of an IAB node is also referred to as an upper-level device/node of the IAB node, and a child node of the IAB node is also referred to as a lower-level device/node of the IAB node.

Figure 2:
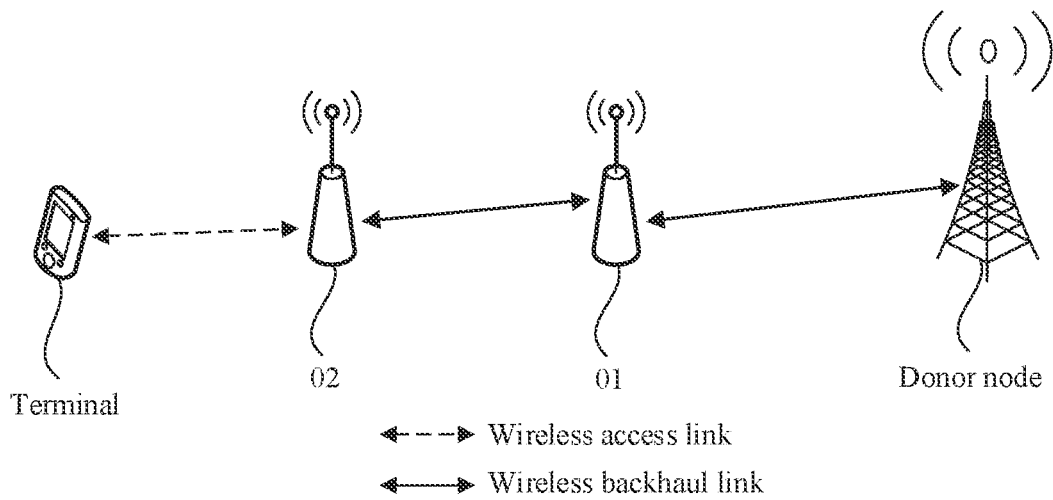

For example, as shown in FIG. 2, from a perspective of downlink transmission, a parent node of an IAB node 01 is a donor node. In other words, the IAB node 01 is a child node of the donor node. A child node of the IAB node 01 is an IAB node 02. In other words, a parent node of the IAB node 02 is the IAB node 01.

For ease of description, basic terms used in this application are defined below.

Parent node: The parent node is a previous-hop node (also referred to as an upper-level device or an upper-level node) on a downlink, and is a node that provides a wireless backhaul link resource.

Child node: The child node is a next-hop node (referred to as a lower-level device or a lower-level node) on a downlink, and is a node that transmits data to a network by using a backhaul link resource or receives data from a network. The network herein is a core network or another network above an access network, for example, the internet or a dedicated network. It should be understood that an uplink may be a link through which data passes when a terminal sends the data to a donor node.

Wireless access link: The wireless access link is a wireless link used when a terminal communicates with a node (for example, an IAB node, a donor node, or a donor DU) that provides an access service for the terminal, and includes an uplink transmission link and a downlink transmission link. Uplink transmission on the wireless access link is also referred to as uplink transmission on an access link, and downlink transmission on the wireless access link is also referred to as downlink transmission on an access link. Uplink transmission on the wireless access link is also referred to as uplink transmission on an access link, and downlink transmission on the wireless access link is also referred to as downlink transmission on an access link.

Wireless backhaul link: The wireless backhaul link is a wireless link used when a wireless backhaul node communicates with a parent node of the wireless backhaul node, and includes an uplink transmission link and a downlink transmission link. Uplink transmission on the wireless backhaul link is also referred to as uplink transmission on a backhaul link, and downlink transmission on the wireless backhaul link is also referred to as downlink transmission on a backhaul link. The wireless backhaul node includes but is not limited to the foregoing IAB node.

Path: The path is a full route from a sending node to a receiving node. The path includes at least one link. In this application, the link represents a connection between adjacent nodes.

F1 interface message: The F1 interface message is a control plane message on an interface between a CU and a DU. In an IAB scenario, the CU exists only in a donor base station, and a wireless backhaul node includes a role of the DU. There may be a communications interface between a CU and a DU in an IAB node, namely, an F1 interface (or an F1* interface). The F1 interface includes a user plane and a control plane, and an application protocol layer of the control plane is an F1AP (F1 application Protocol) layer. A control plane message on the F1 interface between the CU and the IAB node is referred to as an F1AP message, and may be used to manage the F1 interface, configure the DU in the IAB node, transmit a radio resource control (RRC) message of a terminal, and the like.

Adaptation layer: The adaptation layer (or adapt layer) is introduced into a backhaul link of an IAB node, and is used to carry one or more types of related information required for routing or QoS guarantee or identification of a terminal and a bearer, and provide one or more of routing or QoS mapping functions required for data forwarding.

Adaptation layer message: The adaptation layer message is information carried in the adaptation layer. In an IAB protocol architecture, each DU has an adaptation layer, and information exchange between different IAB nodes may be implemented by carrying the information in the adaptation layer.

RLC channel ( ): The RLC channel is a channel between an RLC layer and an upper-layer protocol layer. A radio bearer (RB) corresponds to configurations of a higher-layer (for example, a PDCP layer) part and a lower-layer (for example, an RLC layer and a MAC layer) part. An RLC bearer refers to the configuration that is of the lower-layer part and that corresponds to the RB, and specifically includes configurations of an RLC layer entity and a MAC logical channel. For detailed explanations about the RLC bearer, refer to related explanations in the 3GPP TS 37.340 v15.3.0 communications protocol. For example, in an IAB backhaul link, if an upper-layer protocol corresponding to RLC is an adaptation layer, the RLC channel is a channel between the adaptation layer and the RLC layer, and the RLC channels are in a one-to-one correspondence with logical channels. In addition, the RLC channel may be named as the RLC bearer in the protocol.

Data of a terminal: The data of the terminal may include user plane data and control plane data or signaling of the terminal. In the embodiments of this application, the data of the terminal may be considered as a backhaul service for an IAB node. In addition, there is a service terminated at a DU part in an IAB node, for example, an F1 application protocol (F1AP) message between an IAB-DU and a CU, which may also be considered as a backhaul service. Therefore, each IAB node needs to transmit both an access-related service (MT access traffic) and a backhaul service on a wireless backhaul link on which the IAB node communicates with a parent node of the IAB node.

An MT part in an IAB node may access a network in a manner used by a terminal to access the network, and establish a session (PDU session) with a core network to transmit MT service data. The service data originates from or terminates at the MT part in the IAB node, and therefore may also be referred to as an MT access-related service. Typical MT access-related services are as follows: For example, the MT may establish a session with the core network to connect to an operation, administration, and maintenance (OAM) network element, and then download a necessary profile required by the IAB node from the OAM network element. A service used by the MT to download the profile from the OAM network element is an MT access-related service, and the MT access-related service needs to be transmitted on a wireless backhaul link (a backhaul link between an IAB node and a base station or between two IAB nodes). The service of the terminal is first transmitted to the IAB node through a wireless access link. The service of the terminal may alternatively be transmitted on the wireless backhaul link.

There is a clear hierarchical relationship between a radio access network device and a donor node. Each radio access network device considers a radio access network device that provides a backhaul service for the radio access network device as a parent node.

To better understand a downlink buffer status feedback method and an apparatus that are applicable to a wireless relay communications system in the embodiments of this application, the following first describes the wireless relay communications system to which the embodiments of this application are applicable. FIG. 1 is a schematic diagram of an overall architecture of a wireless relay communications system to which an embodiment of this application is applicable. FIG. 2 to FIG. 10 are schematic diagrams of various possible topologies of wireless relay communications systems.

It should be noted that the communications system to which the embodiments of this application are applicable includes but is not limited to a narrowband-internet of things (NB-IoT) system, a wireless local area network (WLAN) system, an LTE system, a next generation 5G mobile communications system, or a communications system after 5G, for example, a new radio (new radio, NR) system or a device-to-device (D2D) communications system.

There is a clear hierarchical relationship between a radio access network device and a donor node. Each radio access network device considers a radio access network device that provides a backhaul service for the radio access network device as a parent node.

FIG. 1 is a schematic diagram of a wireless relay communications system (which may also be referred to as a wireless backhaul system) to which an embodiment of this application is applicable. As shown in FIG. 1, the wireless relay communications system includes a core network device 210, a radio access network device 220, one or more wireless backhaul devices 230, and at least one terminal (for example, a terminal 240 and a terminal 250 shown in FIG. 1). In this application, the terminal is connected to the wireless backhaul device 230 in a wireless manner, and is connected to the radio access network device 220 by using the one or more wireless backhaul devices 230. Certainly, some of the at least one terminal may also be directly connected to the radio access network device 220 in a wireless manner.

The radio access network device 220 is connected to the core network device 210 in a wireless or wired manner. The core network device 210 and the radio access network device 220 may be different physical devices independent of each other, or a function of the core network device 210 and a logical function of the radio access network device may be integrated into one physical device, or a part of a function of the core network device 210 and a part of a function of the radio access network device may be integrated into one physical device. The at least one terminal may be located at a fixed location, or may be mobile. FIG. 1 is merely a schematic diagram. The wireless relay communications system may further include another network device. Quantities of core network devices, wireless backhaul devices, radio access network devices, and terminals included in the wireless relay communications system are not limited in this embodiment of this application.

Communication between the wireless backhaul device 230 and the terminal and between the terminals may be performed by using a licensed spectrum ( ), or an unlicensed spectrum ( ), or both the licensed spectrum and the unlicensed spectrum. Communication between the wireless backhaul device 230 and the terminal and between the terminals may be performed by using a spectrum below 6 gigahertz (GHz), or a spectrum above 6 GHz, or both the spectrum below 6 GHz and the spectrum above 6 GHz. A spectrum resource used between the radio access network device and the terminal is not limited in this embodiment of this application.

There may be a wireless access link between any one of the at least one terminal and the wireless backhaul device 230. There is a wireless backhaul link between any two of the one or more wireless backhaul devices 230, and there is a wireless backhaul link between the wireless backhaul device 230 and the radio access network device 220.

A radio bearer of each of the at least one terminal may be mapped to the wireless access link. In other words, data of various service types of the at least one terminal is transmitted in the wireless relay communications system, and is transmitted on the wireless access link by using the radio bearer. When the data of the terminal is transmitted to the wireless backhaul device 230, the wireless backhaul device 230 may transmit the data of the terminal to a parent node or the radio access network device 220 on the wireless backhaul link by using an RLC bearer/RLC channel. In addition, there is a one-to-one or many-to-one mapping relationship between radio bearers and RLC channels and between RLC channels. For example, there is a mapping relationship between at least one RLC bearer/RLC channel on a wireless backhaul link between a wireless backhaul device and a parent node of the wireless backhaul device and at least one RLC bearer/RLC channel on a wireless backhaul link between the wireless backhaul device and a child node of the wireless backhaul device. To be specific, services on different RLC channels are aggregated on a same RLC channel during next-hop transmission.

It should be understood that the wireless backhaul device in FIG. 1 may be a relay node or an IAB node. The following separately describes a layout of the wireless backhaul device.

FIG. 2 shows a topology of a wireless relay communications system by using an IAB system as an example. The IAB system includes a donor node, an IAB node 01, an IAB node 02, and a terminal served by the IAB node 02.

A parent node of the IAB node 01 is the donor node. The IAB node 01 is a parent node of the IAB node 02. In this embodiment of this application, the IAB node 01 is also referred to as a next-hop node (or a next-level device) of the IAB node 02 in an upstream direction. An uplink data packet of the terminal served by the IAB node 02 is transmitted to the donor node through the IAB node 02 and the IAB node 01 in sequence, and then sent by the donor node to a core network (the core network is not shown in FIG. 2).

For example, the core network is a 4G core network (for example, an EPC (evolved packet core) network). In this case, the donor node receives an uplink data packet from the terminal, and transmits the uplink data packet to the EPC network. Alternatively, the donor node receives a downlink data packet from the EPC network, and sends the downlink data packet to the terminal through the IAB node 01 and the IAB node 02 in sequence.

For example, the core network is a 5G core (5GC) network. The donor node sends an uplink data packet to a user plane function (UPF) entity in the 5G network. A downlink data packet is received by the donor node from the 5G core network, and then sent to the terminal through the IAB node 01 and the IAB node 02 in sequence.

It should be understood that in FIG. 2, there is one available path for data transmission between the terminal and the donor node: the terminal ↔ the IAB node 02 ↔ the IAB node 01 ↔ the donor node.

Figure 3:
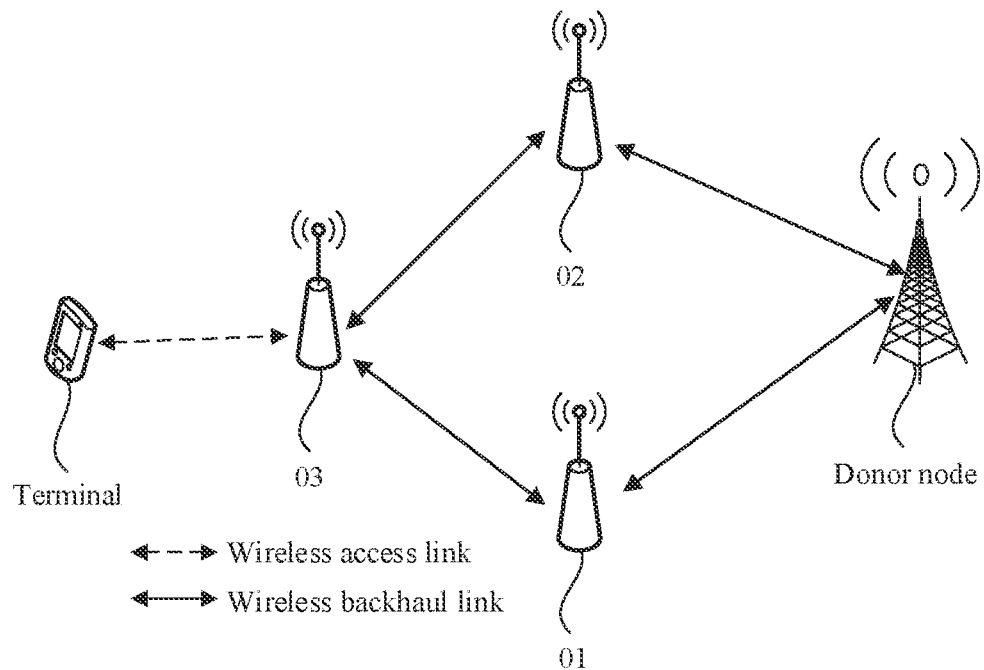

FIG. 3 shows a topology of a wireless relay communications system by using an IAB system as an example. The IAB system includes a donor node, an IAB node 01, an IAB node 02, an IAB node 03, and a terminal served by the IAB node 02 and the IAB node 03. A parent node of the IAB node 01 is the donor node, and a parent node of the IAB node 02 is the donor node. The IAB node 01 is a parent node of the IAB node 03. The IAB node 02 is a parent node of the IAB node 03. Therefore, the IAB node 03 has two parent nodes. In other words, the IAB node 03 includes two next-hop nodes (or referred to as next-level devices) on an uplink, and an uplink data packet that needs to be sent through the IAB node 03 may be transmitted to the donor node through two paths. In this application, the IAB node 01 is also referred to as a first next-hop node of the IAB node 03 in an upstream direction, and the IAB node 02 is also referred to as a second next-hop node of the IAB node 03 in the upstream direction. An uplink data packet of the terminal may be transmitted to the donor node through one or more IAB nodes, and then sent by the donor node to a core network. A downlink data packet is received by the donor node from the core network, and then sent to the terminal through an IAB node. In FIG. 3, there are two available paths for data transmission between the terminal and the donor node: Path 1: the terminal ↔ the IAB node 03 ↔ the IAB node 01 ↔ the donor node. Path 2: the terminal ↔ the IAB node 03 ↔ the IAB node 02 ↔ the donor node.

Figure 4:
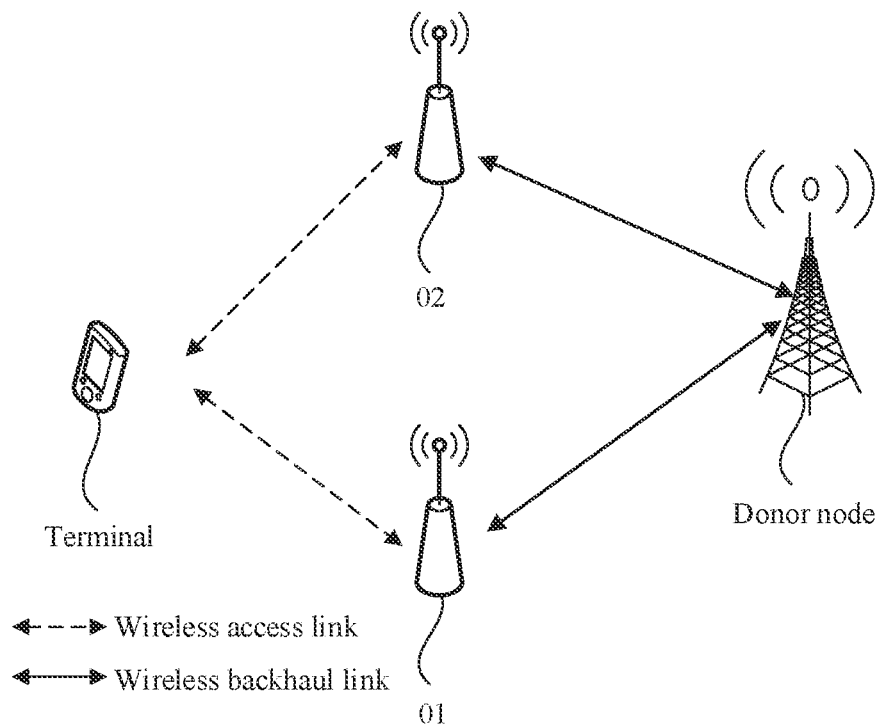

FIG. 4 shows a topology of a wireless relay communications system by using an IAB system as an example. The IAB system includes a donor node, an IAB node 01, an IAB node 02, and a terminal served by the IAB node 01 and the IAB node 02. A parent node of IAB node 01 is the donor node. A parent node of IAB node 02 is the donor node. An uplink data packet of the terminal may be transmitted to the donor node through one or more IAB nodes, and then sent by the donor node to a core network. A downlink data packet is received by the donor node from the core network, and then sent to the terminal through an IAB node. In FIG. 4, there are two available paths for data transmission between the terminal and the donor node: Path 1: the terminal ↔ the IAB node 01 ↔ the donor node. Path 2: the terminal ↔ the IAB node 02 ↔ the donor node.

Figure 5:
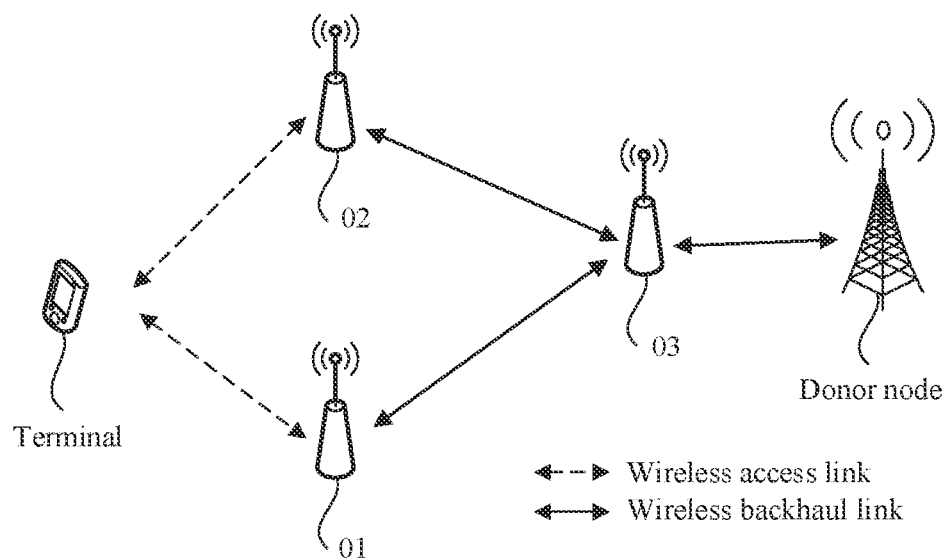

FIG. 5 shows a topology of a wireless relay communications system by using an IAB system as an example. The IAB system includes a donor node, an IAB node 01, an IAB node 02, an IAB node 03, and a terminal served by the IAB node 01 and the IAB node 02. A parent node of IAB node 03 is the donor node. The IAB node 03 is a parent node of the IAB node 02, and the IAB node 03 is also a parent node of the IAB node 01. An uplink data packet of the terminal may be transmitted to the donor node through one or more IAB nodes, and then sent by the donor node to a core network. A downlink data packet is received by the donor node from the core network, and then sent to the terminal through an IAB node. In FIG. 5, there are two available paths for data transmission between the terminal and the donor node: Path 1: the terminal ↔ the IAB node 02 ↔ the IAB node 03 ↔ the donor node. Path 2: the terminal ↔ the IAB node 01 ↔ the IAB node 03 ↔ the donor node.

Figure 6:
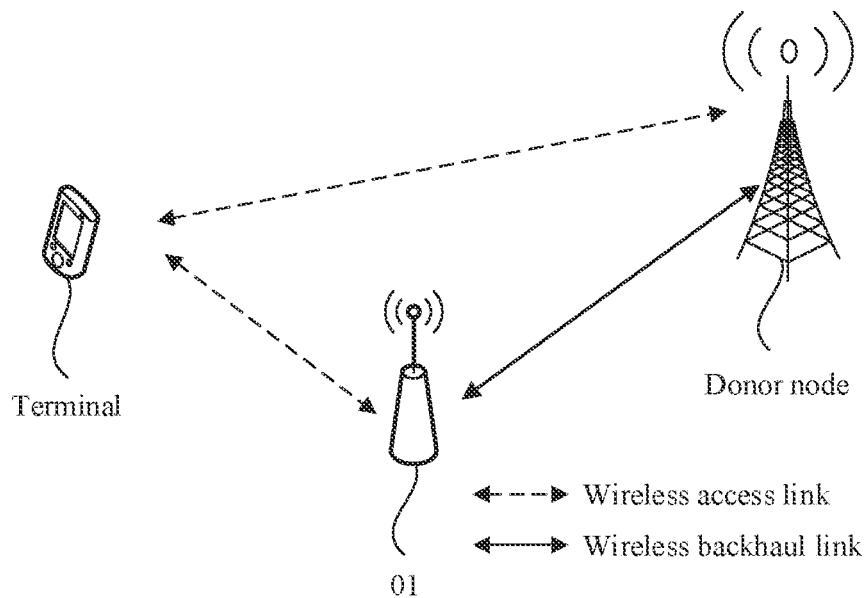

FIG. 6 shows a topology of a wireless relay communications system by using an IAB system as an example. The IAB system includes a donor node, an IAB node 01, and a terminal served by the IAB node 01. A parent node of IAB node 01 is the donor node. An uplink data packet of the terminal may be transmitted to the donor node through one or more IAB nodes, and then sent by the donor node to a core network. A downlink data packet is received by the donor node from the core network, and then sent to the terminal through an IAB node. In FIG. 6, there are two available paths for data transmission between the terminal and the donor node: Path 1: the terminal ↔ the donor node. Path 2: the terminal ↔ the IAB node 01 ↔ the donor node.

Figure 7:
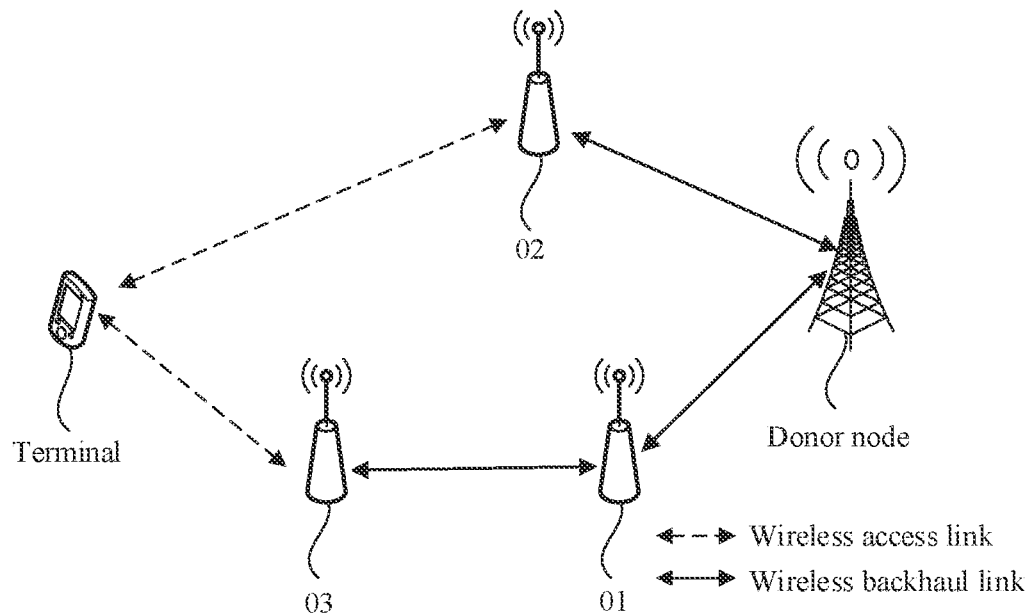

FIG. 7 shows a topology of a wireless relay communications system by using an IAB system as an example. The IAB system includes a donor node, an IAB node 01, an IAB node 02, an IAB node 03, and a terminal served by the IAB node 03 and the IAB node 02. A parent node of the IAB node 01 is the donor node, and a parent node of the IAB node 02 is the donor node. The IAB node 01 is a parent node of the IAB node 03. An uplink data packet of the terminal may be transmitted to the donor node through one or more IAB nodes, and then sent by the donor node to a core network. A downlink data packet is received by the donor node from the core network, and then sent to the terminal through an IAB node. In FIG. 7, there are two available paths for data transmission between the terminal and the donor node: Path 1: the terminal ↔ the IAB node 02 ↔ the donor node. Path 2: the terminal ↔ the IAB node 03 the IAB node 01 ↔ the donor node.

Figure 8:
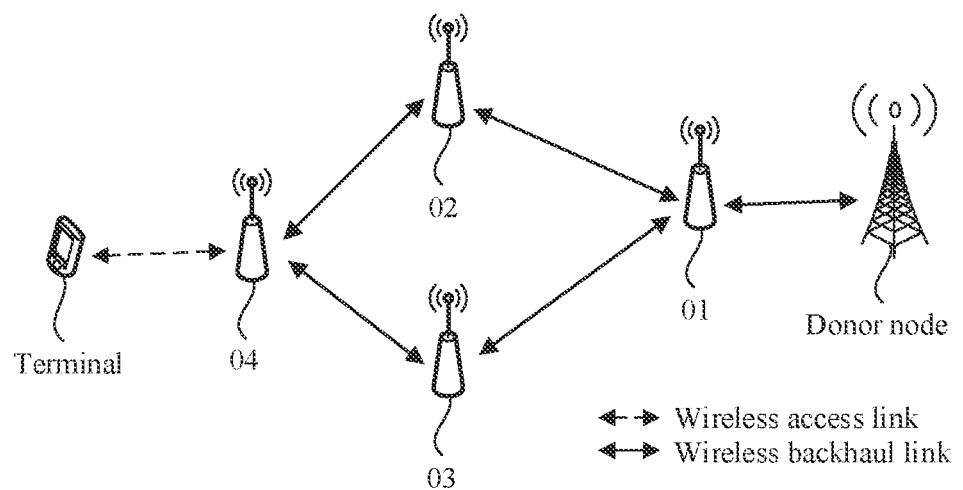

FIG. 8 shows a topology of a wireless relay communications system by using an IAB system as an example. The IAB system includes a donor node, an IAB node 01, an IAB node 02, an IAB node 03, an IAB node 04, and a terminal served by the IAB node 04. A parent node of IAB node 01 is the donor node. The IAB node 01 is a parent node of the IAB node 02. The IAB node 01 is also a parent node of the IAB node 03. The IAB node 02 is a parent node of the IAB node 04. The IAB node 03 is a parent node of the IAB node 04. An uplink data packet of the terminal may be transmitted to the donor node through one or more IAB nodes, and then sent by the donor node to a core network. A downlink data packet is received by the donor node from the core network, and then sent to the terminal through an IAB node. In FIG. 8, there are two available paths for data transmission between the terminal and the donor node: Path 1: the terminal ↔ the IAB node 04 ↔ the IAB node 02 ↔ the IAB node 01 ↔ the donor node. Path 2: the terminal ↔ the IAB node 04 ↔ the IAB node 03 ↔ the IAB node 01 ↔ the donor node.

Figure 9:
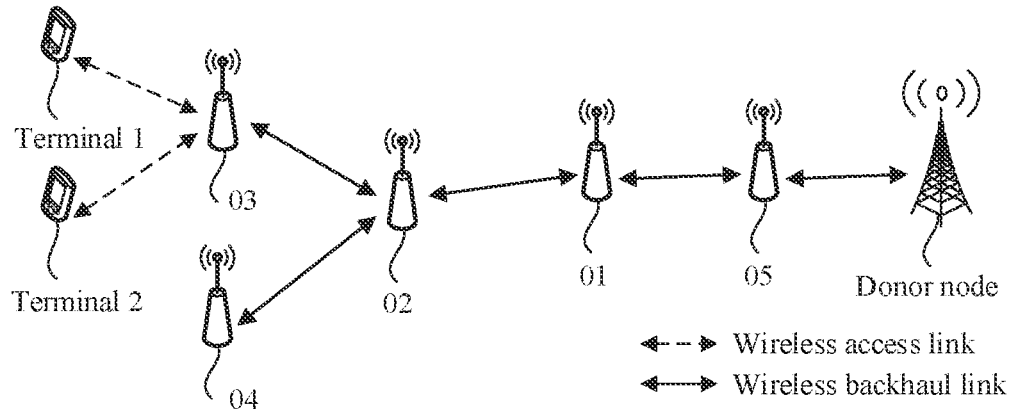

FIG. 9 shows a topology of a wireless relay communications system by using an IAB system as an example. The IAB system includes a donor node, an IAB node 01, an IAB node 02, an IAB node 03, an IAB node 04, an IAB node 05, and a terminal 1 and a terminal 2 that are served by the IAB node 03. A parent node of the IAB node 05 is the donor node. The IAB node 05 is a parent node of the IAB node 01. The IAB node 01 is a parent node of the IAB node 02. The IAB node 02 is a parent node of the IAB node 03. The IAB node

02 is also a parent node of the IAB node 04. An uplink data packet of the terminal may be transmitted to the donor node through one or more IAB nodes, and then sent by the donor node to a core network. A downlink data packet is received by the donor node from the core network, and then sent to the terminal through an IAB node. In FIG. 9, a path for data transmission between the terminal 1 and the donor node may be: the terminal 1 ↔ the IAB node 03 ↔ the IAB node 02 ↔ the IAB node 01 ↔ the IAB node 05 ↔ the donor node. A path for data transmission between the terminal 2 and the donor node may be: the terminal 2 ↔ the IAB node 03 ↔ the IAB node 02 ↔ the IAB node 01 ↔ the IAB node 05 ↔ the donor node.

Figure 10:
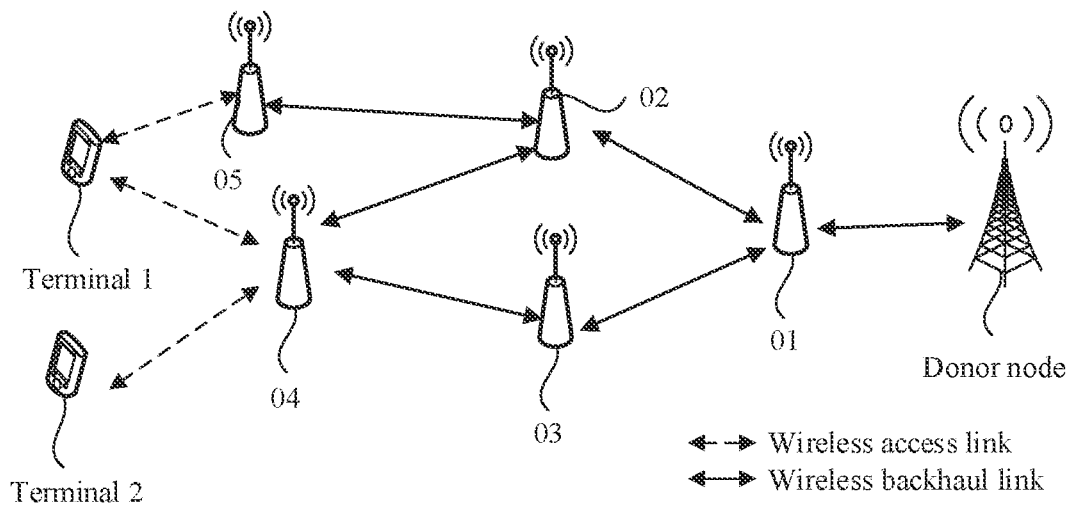

FIG. 10 shows a topology of a wireless relay communications system by using an IAB system as an example. The IAB system includes a donor node, an IAB node 01, an IAB node 02, an IAB node 03, an IAB node 04, an IAB node 05, a terminal 1 served by the IAB node 04, and a terminal 2 served by the IAB node 04.

A parent node of IAB node 01 is the donor node. The IAB node 01 is a parent node of the IAB node 02 and a parent node of the IAB node 03. The IAB node 02 and the IAB node 03 each are a parent node of the IAB node 04. A parent node of the IAB node 05 is the IAB node 03. An uplink data packet of the terminal may be transmitted to the donor node through one or more IAB nodes, and then sent by the donor node to a core network (for example, a user plane function (UPF) network element in a 5G core network). A downlink data packet is received by the donor node from the core network, and then sent to the terminal through an IAB node.

There are two available paths for data transmission between the terminal 1 and the donor node: Path 1: the terminal 1 ↔ the IAB node 04 ↔ the IAB node 03 ↔ the IAB node 01 ↔ the donor node. Path 2: the terminal 1 ↔ the IAB node 04 ↔ the IAB node 02 ↔ the IAB node 01 ↔ the donor node. There are three available paths for data transmission between the terminal 2 and the donor node: Path 3: the terminal 2 ↔ the IAB node 04 ↔ the IAB node 03 ↔ the IAB node 01 ↔ the donor node. Path 4: the terminal 2 ↔ the IAB node 04 ↔ the IAB node 02 ↔ the IAB node 01 ↔ the donor node. Path 5: the terminal 2 ↔ the IAB node 05 ↔ the IAB node 02 ↔ the IAB node 01 ↔ the donor node.

The IAB networks shown in FIG. 1 to FIG. 10 are merely examples. In an IAB scenario in which multi-hop and multi-connectivity are combined, there are more other possible IAB networks. For example, a donor node and an IAB node connected to another donor node form a dual connectivity to provide a service for a terminal. Details are not described herein.

In the embodiments of this application, a radio access network device is an access device in a wireless relay communications system accessed by a terminal in a wireless manner. The radio access network device may include but is not limited to a NodeB (NB), an evolved NodeB (eNodeB), a next generation NodeB (gNB) in a 5G wireless relay communications system, a base station in a future wireless relay communications system, an access node in a wireless fidelity (WiFi) system, or the like. A specific technology and a specific device form that are used by the radio access network device are not limited in the embodiments of this application.

It should be understood that the gNB may access a 5GC network through an NG interface. The eNB may access an EPC network through an S1 interface.

Figure 11:
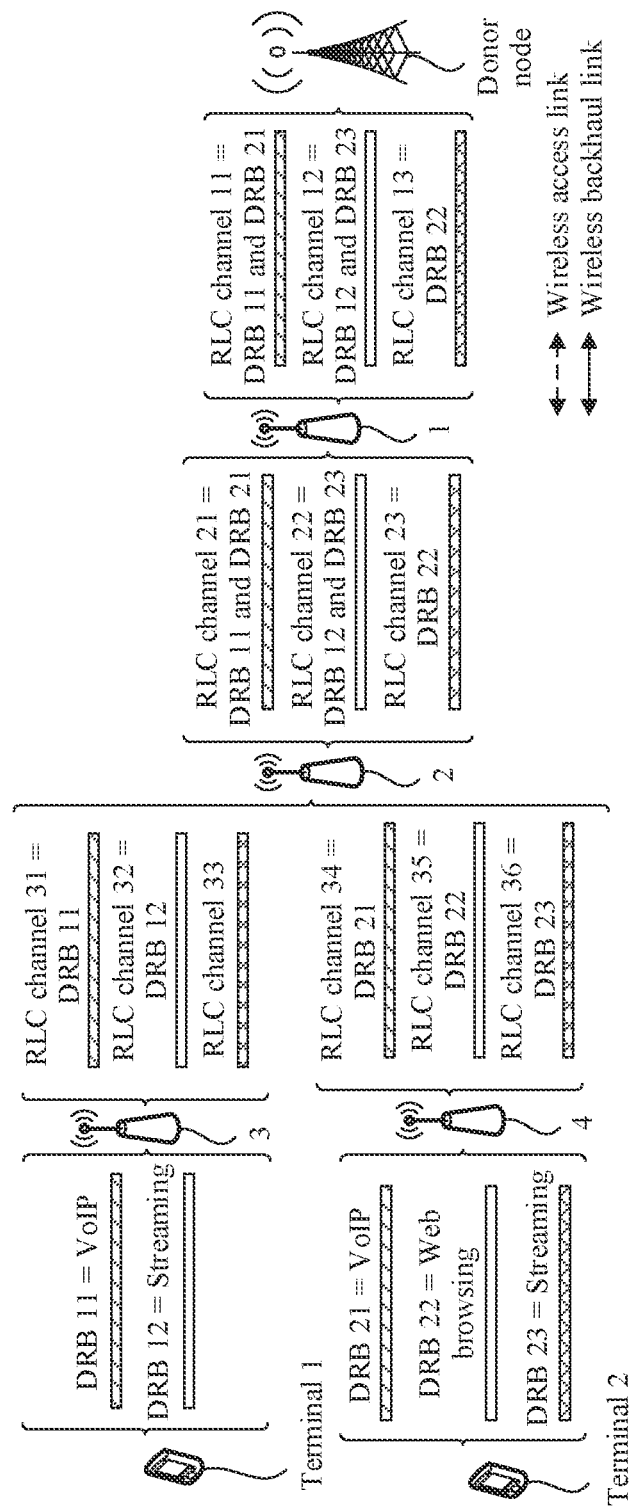

As shown in FIG. 11, a wireless relay communications system includes a donor node, an IAB node 1, an IAB node 2, an IAB node 3, an IAB node 4, a terminal 1, and a terminal 2.

A parent node of the IAB node 1 is the donor node. A wireless backhaul link between the IAB node 1 and the donor node includes an RLC channel 11, an RLC channel 12, and an RLC channel 13.

The IAB node 1 is a parent node of the IAB node 2. A wireless backhaul link between the IAB node 2 and the IAB node 1 includes an RLC channel 21, an RLC channel 22, and an RLC channel 23.

The IAB node 2 is a parent node of the IAB node 3 and a parent node of the IAB node 4. A wireless backhaul link between the IAB node 3 and the IAB node 2 includes an RLC channel 31, an RLC channel 32, and an RLC channel 33. A wireless backhaul link between the IAB node 4 and the IAB node 2 includes an RLC channel 34, an RLC channel 35, and an RLC channel 36.

The terminal 1 accesses the IAB node 3, and communicates with the donor node through the IAB node 2 and the IAB node 1. A wireless access link between the terminal 1 and the IAB node 3 includes a DRB 11 and a DRB 12. The terminal 2 accesses the IAB node 4, and communicates with the donor node through the IAB node 2 and the IAB node 1. A wireless access link between the terminal 2 and the IAB node 4 includes a DRB 21, a DRB 22, and a DRB 23.

Services of the terminal include streaming, VoIP, web browsing (and the like.

A service of the terminal 1 is transmitted to the donor node through the IAB node 3. Specifically, VoIP of the terminal 1 is transmitted to the IAB node 3 through the DRB 11, and streaming of the terminal 1 is transmitted to the IAB node 3 through the DRB 12. After receiving the service of the terminal 1, the IAB node 3 may map a service on the DRB 11 of the terminal 1 to the RLC channel 31 and transmit the service to the IAB node 2, and map a service on the DRB 12 to the RLC channel 32 and transmit the service to the IAB node 2.

A service of the terminal 2 is transmitted to the donor node through the IAB node 4. Specifically, VoIP of the terminal 2 is transmitted to the IAB node 4 through the DRB 21, web browsing of the terminal 2 is transmitted to the IAB node 4 through the DRB 22, and streaming of the terminal 2 is transmitted to the IAB node 4 through the DRB 23. After receiving the service of the terminal 2, the IAB node 4 may map a service on the DRB 21 of the terminal 2 to the RLC channel 34 and transmit the service to the IAB node 2, map a service on the DRB 22 to the RLC channel 35 and transmit the service to the IAB node 2, and map a service on the DRB 23 to the RLC channel 36 and transmit the service to the IAB node 2.

The IAB node 2 bears the services on the DRB 11 and the DRB 21 on the RLC channel 21 and transmits the services to the IAB node 1. The IAB node 2 bears the services on the DRB 12 and the DRB 23 on the RLC channel 22 and transmits the services to the IAB node 1. The IAB node 2 bears the service on the DRB 22 on the RLC channel 23 and transmits the service to the IAB node 1.

The IAB node 1 bears the services on the DRB 11 and the DRB 21 on the RLC channel 11 and transmits the services to the donor node. The IAB node 1 bears the services on the DRB 12 and the DRB 23 on the RLC channel 12 and transmits the services to the donor node. The IAB node 1 bears the service on the DRB 22 on the RLC channel 13 and transmits the service to the donor node.

It should be understood that each IAB node may determine, according to a preset rule, art RLC bearer that is on a next-hop link and to which a service on an RLC bearer on a previous-hop link is mapped for transmission. Manners are as follows:

Manner 1: The IAB node performs determining according to a mapping rule configured by a donor node or a parent node (for example, configures a one-to-one mapping relationship between ingress RLC channels and egress RLC channels for each IAB node).

It should be noted that the RLC channel in this embodiment of this application may be replaced with an RLC bearer, a logical channel, or an RLC entity.

The ingress RLC channel in this embodiment of this application may be an RLC channel between an IAB node and a parent node of the IAB node. The egress RLC channel in this embodiment of this application may be an RLC channel between an IAB node and a child node.

An ingress RLC bearer in this embodiment of this application may be an RLC bearer on a wireless backhaul link between an IAB node and a parent node of the IAB node. An egress RLC bearer in this embodiment of this application may be an RLC bearer on a wireless backhaul link between an IAB node and a child node.

An ingress logical channel in this embodiment of this application may be a logical channel on a wireless backhaul link between an IAB node and a parent node of the IAB node. An egress logical channel in this embodiment of this application may be a logical channel on a wireless backhaul link between an IAB node and a child node.

An ingress RLC entity in this embodiment of this application may be an RLC entity between an IAB node and a parent node of the IAB node. An egress RLC entity in this embodiment of this application may be an RLC entity between an IAB node and a child node.

For example, the donor node configures a mapping relationship between an RLC bearer 11 and an RLC bearer 21 for the IAB node 1, and configures a mapping relationship between an RLC bearer 22 and each of an RLC bearer 32 and an RLC bearer 35 for the IAB node 2.

Manner 2: The IAB node performs determining according to a QoS rule configured by the donor node (for example, configures a specific QoS requirement for each RLC channel, and when the IAB node receives one or more RLC channels from a previous hop and obtains QoS parameters of the one or more RLC channels, the IAB node maps, in a one-to-one manner, the one or more RLC channels to RLC channels that are of a next hop and that correspond to QoS requirements).

The terminal is a device that provides a user with voice and/or data connectivity, for example, a handheld device or a vehicle-mounted device with a wireless connection function. The terminal may also be referred to as user equipment (UE), an access terminal, a user unit, a user station, a mobile station, a mobile console, a remote station, a remote terminal, mobile equipment, a user terminal, wireless telecom equipment, a user agent, user equipment, or a user apparatus. The terminal may be a station (STA) in a wireless local area network (WLAN), or may be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal in a next generation communications system (for example, a 5th generation (5G) communications network), a terminal in a future evolved public land mobile network (PLMN), or the like. 5G may also be referred to as new radio (NR).

For example, in the embodiments of this application, the terminal may alternatively be a wearable device. The wearable device may also be referred to as a wearable intelligent device, and is a general term for wearable devices, such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not only a hardware device, but also implements a powerful function through software support, data exchange, and cloud interaction. In a broad sense, the wearable intelligent device includes full-featured and large-sized devices that can implement all or some of functions without depending on smartphones, for example, smart watches or smart glasses, and devices that focus on only one type of application function and need to be used with other devices such as smartphones, for example, various smart bands, or smart jewelry for monitoring physical signs.

It should be understood that the radio access network device and the terminal may be deployed on land, including an indoor or outdoor device and terminal, a handheld device and terminal, or a vehicle-mounted device and terminal, may be deployed on water, or may be deployed on an airplane, a balloon, and a satellite in the air. Application scenarios of the radio access network device and the terminal are not limited in the embodiments of this application.

It should be understood that the embodiments of this application may be applied to downlink signal transmission, or may be applied to uplink signal transmission, or may be applied to device-to-device (D2D) signal transmission. For the downlink signal transmission, a sending device is the radio access network device, and correspondingly, a receiving device is the terminal. For the uplink signal transmission, a sending device is the terminal, and correspondingly, a receiving device is the radio access network device. For the D2D signal transmission, a sending device is the terminal, and correspondingly, a receiving device is also the terminal. A signal transmission direction is not limited in the embodiments of this application.

Currently, establishment of a radio bearer on a radio air interface of the terminal is controlled by a base station. The base station determines, based on a quality of service (QoS) profile that is related to a terminal service and that is received from a core network, an air interface radio bearer (for example, a data radio bearer (DRB) or a signaling radio bearer (SRB)) that needs to be established with the terminal, and then sends a profile related to the radio bearer to the terminal, so that the terminal completes, under control of a network side, configurations required for establishing the radio bearer, for example, configurations of a packet data convergence protocol (PDCP) layer, an RLC layer, and a logical channel. In an IAB network, an RLC bearer used to transmit a backhaul-type service needs to be established on a wireless backhaul link between an IAB node and a parent node. The radio bearer of the terminal is on the wireless backhaul link, and is mapped to an RLC bearer on the wireless backhaul link for transmission. When blockage or congestion occurs in a downstream direction of a wireless backhaul link for a hop, a buffer sent by a base station (or a DU) in the IAB node on a downlink encounters congestion, and a packet drop may occur.

For example, as shown in FIG. 11, when blockage occurs in a downstream direction of a wireless backhaul link between the IAB node 2 and the IAB node 3, because the IAB node 1 cannot sense a downlink buffer status of a base station (or a DU) in the IAB node 2, and continuously sends downlink data to an MT in the IAB node 2, a downlink buffer of the base station (or the DU) in the IAB node 2 encounters congestion, data is further discarded due to continuous congestion and timeout, and a packet drop occurs. Therefore, in this embodiment of this application, a first node feeds back, to a second node, a downlink buffer status at a granularity of a bearer between the first node and a parent node, so that the second node controls, in a timely manner, a transmission rate of downlink data sent to the first node, thereby avoiding downlink data congestion at the first node.

Figure 12:
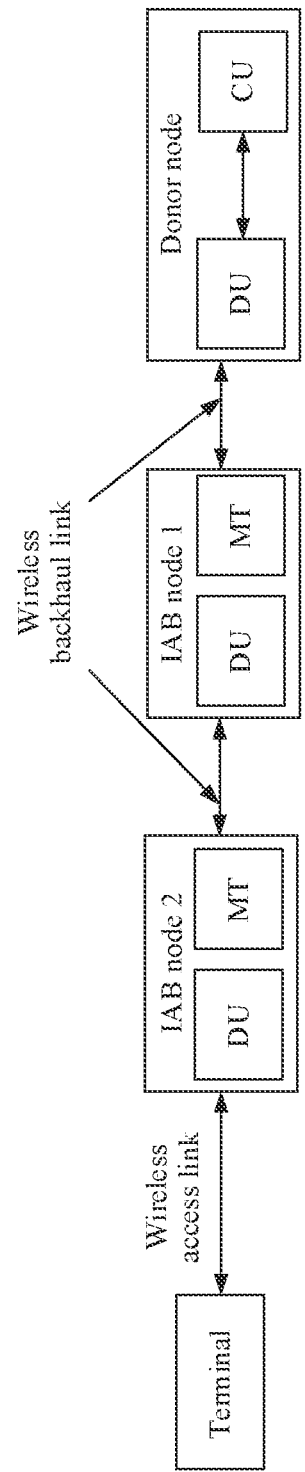

FIG. 12 is a schematic diagram of a topology of an IAB node. Referring to FIG. 12, in an IAB network, one transmission path between a terminal and a donor node (namely, an IAB donor) may include one or more IAB nodes. Each IAB node needs to maintain a wireless backhaul link on which the IAB node communicates with a parent node, and further needs to maintain a wireless link with a child node. Because locations of the IAB nodes in the transmission path are different, there are two types of wireless links between an IAB node and a child node. If the child node of the IAB node, for example, an IAB node 2 in FIG. 12, is a terminal, there is a wireless access link between the IAB node 2 and the child node (namely, the terminal). If the child node of the IAB node, for example, an IAB node 1 in FIG. 12, is another IAB node, there is a wireless backhaul link between the IAB node 1 and the child node (namely, the IAB node 2).

It should be understood that if the donor node includes a distributed unit (DU) and a centralized unit (CU), and the IAB node includes an MT or a DU, the wireless access link may be a link between the terminal and the DU in the IAB node. The wireless backhaul link may be a link between an MT in an IAB node and a DU in a parent node of the IAB node.

An embodiment of this application provides a downlink buffer status feedback method. A transmit end for the downlink buffer status feedback method may be a first node, or may be a chip used in the first node. A receive end for the downlink buffer status feedback method may be a second node, or may be a chip used in the second node. For example, in the following embodiments, the transmit end for the downlink buffer status feedback method is a base station, and the receive end for the downlink buffer status feedback method is a terminal.

Figure 13:
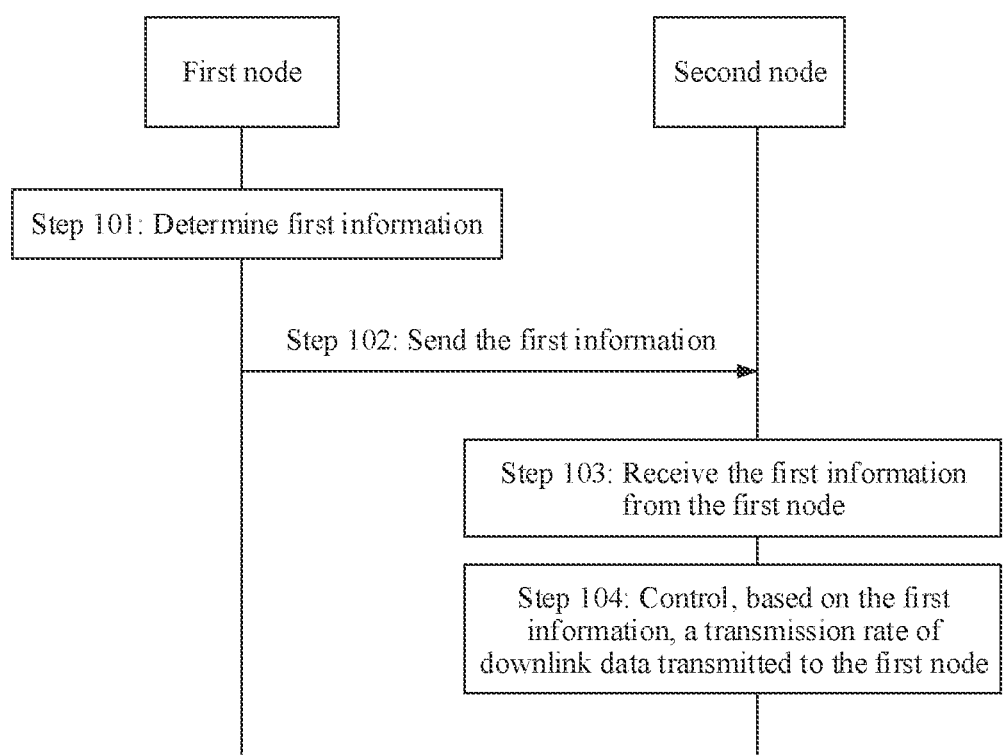
FIG. 13 is a schematic flowchart 1 of a downlink buffer status feedback method according to an embodiment of this application.

FIG. 13 shows a downlink buffer status feedback method according to an embodiment of this application. The method is applicable to the wireless relay communications system shown in any one of FIG. 1 to FIG. 12. It should be noted that the communications systems shown in FIG. 1 to FIG. 12 are used, to describe the technical solutions in the embodiments of this application more clearly, and do not constitute a limitation on the technical solutions provided in the embodiments of this application. The downlink buffer status feedback method includes the following steps.

Step 101: A first node determines first information. The first information is used to indicate a downlink buffer status of a first bearer between the first node and a parent node of the first node.

The first node is a relay node in the wireless relay communications system. The parent node of the first node may be another relay node in the wireless relay communications system. The parent node of the first node may alternatively be a donor node in the wireless relay communications system.

For example, the first node may be the IAB node 1 shown in FIG. 10, and the parent node of the first node may be the donor node shown in FIG. 10.

Alternatively, for example, the first node may be the IAB node 2 shown in FIG. 10, and the parent node of the first node may be the IAB node 1 shown in FIG. 10.

It should be understood that the first bearer is at least one bearer on a wireless backhaul link between the first node and the parent node of the first node. For example, the first bearer may be an RLC bearer, an RLC channel, a logical channel, or an RLC entity. The first bearer is used to bear downlink data of a terminal.

In this embodiment of this application, the bearer on the wireless backhaul link refers to a set of services having a specific QoS attribute, for example, a specific data flow, one or more data packets (for example, a data flow of a slice) belonging to a flow, or transmission corresponding to a logical channel at an RLC layer. The bearer on the wireless backhaul link may be identified by using identification information of the bearer, and the identification information of the bearer may be different in different scenarios. For example, if the bearer on the wireless backhaul link corresponds to an RLC bearer, the identification information of the bearer on the wireless backhaul link corresponds to an RLC channel identifier (ID) or an RLC bearer identifier. If the bearer on the wireless backhaul link corresponds to a MAC logical channel, the identification information of the bearer on the wireless backhaul link is a logical channel identifier (LCID). The bearer identifier is not limited in this application.

Because RLC channel IDs are in a one-to-one correspondence with LCIDs, the identification information of the first bearer in this embodiment of this application may also be replaced with the LCID. Further, for a downlink buffer status of each logical channel between the first node and the parent node of the first node, because each LCG includes one or more LCIDs (each LCID maximally corresponds to one LCG), downlink buffer statuses of each LCG may be further grouped (the LCG is applicable to only a scenario in which downlink buffer statuses of all LCIDs are further aggregated into a logical channel group (LCG) after mapping is completed based on an egress bearer and an ingress bearer/LCID).

Step 102: The first node sends the first information to a second node.

It should be understood that the second node is a next-hop node of the first node on an uplink, or a donor node. Alternatively, the second node is a previous-hop node of the first node on a downlink, or a donor node.

For example, the second node is a donor node in the wireless relay communications system or a parent node of the first node.

Step 103: The second node receives the first information from the first node.

In an optional implementation, if the second node receives the first information, the second node may send a first response to the first node. The first response includes an identifier of the to-be-controlled first bearer, or only an acknowledgment message. The first response is sent, so that the first node determines that the second node receives the first information.

In an optional embodiment, the method provided in this embodiment of this application further includes the following step: Step 104: The second node controls, based on the first information, a transmission rate of downlink data transmitted to the first node. It should be understood that step 104 is optional.

In a possible implementation, step 104 in this embodiment of this application may be implemented in the following manner: The second node reduces the transmission rate of the downlink data transmitted to the first node or stops the transmission of the downlink data transmitted to the first node. Specifically, when the second node determines, based on the first information, that congestion occurs at the first node, the second node reduces or stops the transmission rate of the downlink data transmitted to the first node.

According to the downlink buffer status feedback method provided in this embodiment of this application, the first node determines the first information. The first information is used to reflect the downlink buffer status of the first bearer between the first node and the parent node of the first node. Therefore, the first node sends the first information to the second node, so that the second node can adjust, in a timely manner based on the downlink buffer status of the first bearer, the transmission rate of the downlink data transmitted to the first node, to implement flow control on the first node, prevent downlink data congestion at the first node, effectively avoid downlink congestion caused by a factor such as link interruption in an IAB scenario, and prevent an unnecessary downlink data packet drop.

Example (1): Granularity of a Bearer

When the parent node of the first node is the relay node, during downlink data transmission, the parent node of the first node may fail to identify identification information of one or more bearers on a wireless backhaul link between the first node and a child node of the first node. (A mapping relationship between the one or more bearers between the first node and the child node of the first node (for downlink transmission, the one or more bearers between the first node and the child node of the first node may be briefly referred to as egress bearers) and one or more bearers between the first node and the parent node of the first node (for downlink transmission, the one or more bearers between the first node and the parent node of the first node may be briefly referred to as ingress bearers) depends on a configuration of the donor node and/or is implemented by the first node). Therefore, if the first node reports a downlink buffer status at a granularity of an egress bearer between the first node and the child node to the second node, when the second node receives the downlink buffer status at the granularity of the egress bearer, the second node cannot interpret the reported information or incorrectly interprets the reported information.

The first node obtains a downlink buffer status of the first node, and determines the downlink buffer status of the first bearer between the first node and the parent node of the first node based on the mapping relationship between the egress bearer and the ingress bearer, so that the second node can normally interpret the downlink buffer status at the granularity of the egress bearer.

When the second node is the donor node, because a mapping relationship between an egress bearer and an ingress bearer of any relay node is configured by the donor node, that is, the donor base station has bearer information of all wireless backhaul links under the donor base station, if the first node feeds back a downlink buffer status on the ingress bearer to the donor node, the donor node may control, based on the received buffer status information, the transmission rate of the downlink data transmitted to the first node.

In a first possible implementation, the first information includes identification information of the first bearer.

For example, the identification information of the first bearer is used to determine the first bearer. The identification information of the first bearer may be an ID of the first bearer.

In a second possible implementation, the first information further includes a downlink buffer size of the first bearer. A buffer size in the embodiments of this application may also be referred to as a buffer amount. The buffer size in the embodiments of this application may be a specific value, or may be a range. Certainly, the buffer size may alternatively be represented by a percentage, a buffer level, or the like.

For example, the downlink buffer size of the first bearer may include any one or more of the following information corresponding to the first bearer: a remaining downlink buffer size, a downlink buffer occupancy ratio, a first expected downlink transmission rate, a congestion level, a downlink buffer size combination, and indication information indicating whether the downlink buffer size of the first bearer exceeds (is greater than or equal to) a preset buffer size. The downlink buffer size combination includes a total downlink buffer size and a current downlink buffer size.

The remaining downlink buffer size of the first bearer is used to determine a remaining buffer size of the first bearer in a buffer of the first node in a downlink transmission process. The remaining downlink buffer size of the first bearer may be obtained by subtracting the current downlink buffer size of the first bearer from the total downlink buffer size of the first bearer.

The downlink buffer occupancy ratio of the first bearer is used to determine a percentage of a buffer size of the first bearer already used in a downlink transmission process in the total downlink buffer size or a percentage of an unused buffer size of the first bearer in the total downlink buffer size.

For example, if the first information fed back by the first node to the second node includes the downlink buffer occupancy ratio of the first bearer, the second node may include the total downlink buffer size of the first bearer, to calculate the remaining downlink buffer size of the first bearer. In this case, if the second node determines that the remaining downlink buffer size of the first bearer does not meet a preset requirement, the second node may also determine that congestion occurs or is about to occur at the first node, and therefore can control the transmission rate of the downlink data transmitted to the first node. For another example, if the second node does not include the total downlink buffer size of the first bearer, when the first node includes the downlink buffer occupancy ratio of the first bearer, and the second node determines that the downlink buffer occupancy ratio of the first bearer exceeds a threshold, the second node may also determine that congestion occurs or is about to occur at the first node, and therefore can control the transmission rate of the downlink data transmitted to the first node. For example, the downlink buffer occupancy ratio of the first bearer is 0.9, indicating that when 90% of the total buffer size is reached, it is determined that congestion occurs at the first node.

The first expected downlink transmission rate is used to indicate an expected transmission rate of downlink data transmitted on the first bearer or an expected transmission rate of downlink data transmitted to the first node. When the first information includes the first expected downlink transmission rate, step 104 may be specifically implemented in the following manner: The second node controls, based on the first expected downlink transmission rate, the transmission rate of the downlink data transmitted to the first node.

The first expected downlink transmission rate is not limited in the embodiments of this application. It should be understood that if the first node determines, based on the downlink buffer size of the first bearer, that congestion does not occur on the first bearer (to be specific, the remaining downlink buffer size of the first bearer is greater than a first preset threshold, or the current downlink buffer size of the first bearer is less than a second preset threshold), the first expected downlink transmission rate may be used to indicate to increase or maintain the transmission rate of the downlink data transmitted on the first bearer. If the first node determines, based on the downlink buffer size of the first bearer, that congestion occurs on the first bearer (to be specific, the remaining downlink buffer size of the first bearer is less than or equal to a first preset threshold, or the current downlink buffer size of the first bearer is greater than or equal to a second preset threshold), the first expected downlink transmission rate may be used to indicate to reduce the transmission rate of the downlink data transmitted on the first bearer or stop the transmission of the downlink data transmitted on the first bearer.

The congestion level of the first bearer may be used to reflect a congestion degree of the first bearer. For example, the congestion degree of the first node may be non-congestion, congestion, or severe congestion. The first node and the second node each include congestion levels: 1, indicating non-congestion, 2, indicating congestion, and 3, indicating severe congestion. In this way, the second node can determine the congestion level of the first bearer by sending the congestion level. If the second node includes a downlink data transmission rate corresponding to each congestion level, the second node may control, based on the congestion level indicated by the first information and the downlink data transmission rate corresponding to the congestion level, the transmission rate of the downlink data transmitted on the first bearer.

In this embodiment of this application, each bearer may correspond to one total downlink buffer size. Therefore, the first node may determine the congestion level of the first bearer based on a buffered data amount on the first bearer. For example, when determining that the buffered data amount on the first bearer reaches 20%, the first node determines that congestion does not occur. When determining that the buffered data amount on the first bearer reaches 85%, the first node determines that congestion occurs. When determining that the buffered data amount on the first bearer reaches 90%, the first node determines that severe congestion occurs.

For example, if the congestion level indicated by the first information is 3, and a downlink data transmission rate corresponding to the congestion level 3 is V1, the second node may control, based on V1, the transmission rate of the downlink data transmitted on the first bearer.

When the first information includes the downlink buffer size combination, the second node may determine, based on a difference between the total downlink buffer size and the current downlink buffer size, whether the downlink data transmitted on the first bearer encounters congestion at the first node. For example, if the remaining downlink buffer size obtained by subtracting the current downlink buffer size from the total downlink buffer size is less than or equal to the first preset threshold, it indicates that congestion occurs. If the remaining downlink buffer size obtained by subtracting the current downlink buffer size from the total downlink buffer size is greater than the first preset threshold, it indicates that congestion does not occur.

If the indication information indicating whether the downlink buffer size of the first bearer exceeds (is greater than or equal to) the preset buffer size is used to indicate that the downlink buffer size of the first bearer exceeds the preset buffer size, the second node may reduce the transmission rate of the downlink data that is in downlink data sent to the first node and that is transmitted on the first bearer or stop the transmission of the downlink data that is in downlink data sent to the first node and that is transmitted on the first bearer. If the indication information indicating whether the downlink buffer size of the first bearer exceeds the preset buffer size is used to indicate that the downlink buffer size of the first bearer does not exceed the preset buffer size, the second node may increase or maintain the transmission rate of the downlink data that is in downlink data sent to the first node and that is transmitted on the first bearer. The preset buffer size may be predefined or may be configured by the second node.

It should be noted that in this embodiment of this application, the transmission rate is increased or reduced based on a transmission rate currently corresponding to the downlink data. If the downlink data is not transmitted on the first bearer when the first information is fed back, the second node may adjust, with reference to a transmission rate of downlink data on another bearer on the wireless backhaul link between the first node and the second node, the transmission rate of the downlink data transmitted on the first bearer. Alternatively, if the second node includes an initial transmission rate of downlink data corresponding to each bearer on a wireless backhaul link between any two nodes, the second node may adjust, based on the initial transmission rate, the transmission rate of the downlink data transmitted on the first bearer.

The expected downlink transmission rate in the embodiments of this application may be a specific downlink data transmission rate. Certainly, the expected downlink transmission rate may alternatively be used to reflect a to-be reduced downlink data transmission rate or a to-be increased downlink data transmission rate. The expected downlink transmission rate may alternatively be an expected downlink data transmission rate range.

The to-be-reduced downlink data transmission rate indicates a data transmission rate that needs to be reduced on one or more bearers. A unit of the downlink data transmission rate may be bit/s, or another unit may be used. This is not limited in this application.

The to-be-increased downlink data transmission rate indicates a data transmission rate that needs to be increased on one or more bearers.

It should be understood that both the to-be-reduced downlink data transmission rate and the to-be-increased downlink data transmission rate may exist, or either of the to-be-reduced downlink data transmission rate and the to-be-increased downlink data transmission rate may exist. The to-be-reduced downlink data transmission rate and the to-be-increased downlink data transmission rate may be used in combination with the congestion level, or may not be used in combination with the congestion level. This is not limited in this embodiment of this application.

In an optional example, in this embodiment of this application, the first node may further send any one or more of a time length for flow control and a timestamp to the second node.

The time length for the flow control is used to indicate a time for the flow control. Because the flow control is an expected process, if the time for the flow control is excessively short, data on one or more bearers of the first node may change sharply, and a buffer is relatively unstable. The time length for the flow control may be used to better control the bearer of the first node not to undergo a sharp change. In particular, a flow control period or a time window may be defined. To be specific, a same flow control time length is used for each flow control. Further, the first node may send a flow control indication based on a period. If the period is predefined, or is configured by an upper-level node, for example, the second node or the donor node, for the first node, the field is not mandatory.

The timestamp is used to identify a start time at which congestion occurs at the first node. When flow control based on a time length is implemented, that is, when the time length for the flow control is included, the timestamp may indicate a start time. If the flow control period is defined, and the flow control can be implemented at the start location of the period, the field is not mandatory.

It should be understood that the first information in this embodiment of this application may include any one or more of the identification information of the first bearer and the downlink buffer size of the first bearer. When the first information includes only the identification information of the first bearer, the first information is used to indicate that the downlink data that is transmitted on the first bearer and that is indicated by the identification information of the first bearer encounters congestion or is about to encounter congestion at the first node. Therefore, the second node needs to reduce a transmission rate of the downlink data sent on the corresponding first bearer or stop a transmission of the downlink data sent on the corresponding first bearer.

Because there may be another bearer on the wireless backhaul link between the first node and the parent node of the first node in addition to the first bearer, if the first node directly controls, based on the downlink buffer status of the first bearer, the transmission rate of the downlink data transmitted to the first node, a transmission rate of downlink data transmitted on the another bearer may be affected. Therefore, in a possible implementation, step 104 in this embodiment of this application may be specifically implemented in the following manner: The second node controls, based on the identification information of the first bearer, the transmission rate of the downlink data that is in the downlink data transmitted to the first node and that is transmitted on the first bearer.

For example, if there are an RLC channel 1 and an RLC channel 2 between the first node and the second node, and the first information is used to indicate that downlink data transmitted on the RLC channel 1 is about to encounter congestion at the first node, the second node may control a transmission rate of the downlink data that is in the downlink data sent to the first node and that is transmitted on the RLC channel 1, and maintain a transmission rate of downlink data transmitted on the RLC channel 2 unchanged.

In a possible implementation, if the first information includes the downlink buffer size of the first bearer and the identification information of the first bearer, the second node may determine the first bearer based on the identification information of the first bearer, and then adjust the transmission rate of the downlink data on the first bearer based on the downlink buffer size of the first bearer.

For example, the first node may report downlink buffer statuses of a plurality of first bearers to the second node. In this way, the second node may control, based on a downlink buffer status of each first bearer, a transmission rate of downlink data that is in the downlink data sent to the first node and that is transmitted on each first bearer.

For example, the first node feeds back, to the second node, downlink buffer statuses respectively corresponding to the RLC channel 1 and the RLC channel 2. In this case, the second node may adjust, based on the downlink buffer status corresponding to the RLC channel 1, a transmission rate of downlink data that is in the downlink data sent to the first node and that is transmitted on the RLC channel 1, and adjust, based on the downlink buffer status corresponding to the RLC channel 2, a transmission rate of downlink data that is in the downlink data sent to the first node and that is transmitted on the RLC channel 2.

It should be understood that if the first information is used to indicate the downlink buffer status of the first bearer, the downlink buffer status of the first bearer includes buffer statuses corresponding to all downlink data transmitted on the first bearer.

As described above, the first bearer may bear downlink data of a plurality of terminals, and the plurality of terminals may access different IAB nodes. If the second node directly performs flow limiting on the downlink data transmitted on the first bearer, a transmission rate of downlink data between the first node and another child node may be affected. Therefore, when the first node sends the first information to the second node again, the first information may carry identification information of a third node to which downlink data is transmitted.

In an optional implementation in Example (1), the method provided in this embodiment of this application further includes: The first node may send the identification information of the third node to the second node. The second node receives the identification information of the third node from the first node. The third node is a target node for the downlink data transmitted on the first bearer. For example, the third node may be a terminal, or the third node may be an IAB node accessed by the terminal.

It should be noted that the downlink data transmitted on the first bearer is actually sent to the terminal. If the target receiving terminal is used as a target node for routing in routing management, the identification information of the terminal is carried in a packet header of the downlink data. If the IAB node accessed by the target receiving terminal is used as a target node for routing in routing management, the identification information of the IAB node accessed by the terminal is carried in a packet header of the downlink data.

In an optional implementation, the identification information of the third node may be carried in the first information. Alternatively, the identification information of the third node may be sent to the second node in information other than the first information. This is not limited in this embodiment of this application.

As shown in FIG. 11, for example, the first node is an IAB node 2 and the second node is an IAB node 1. It is assumed that a downlink buffer size of an RLC channel 21 (used to transmit downlink data on a DRB 11 of a terminal 1 and downlink data on a DRB 21 of a terminal 2, but does not necessarily include identification information of the terminal and the DRB of the terminal) is fed back. In this case, if congestion occurs only on a wireless backhaul link between the IAB node 2 and an IAB node 3, but no congestion occurs on a wireless backhaul link between the IAB node 2 and an IAB node 4, because the IAB node 1 performs, based on the downlink buffer size of the RLC channel 21, flow limiting on downlink data transmitted on the RLC channel 21 between the IAB node 1 and the IAB node 2, the wireless backhaul link between the IAB node 2 and the IAB node 4 is affected. Therefore, the first node sends the identification information of the third node to the second node, so that a flow control mechanism can be optimized. To be specific, the second node may control, based on the identification information of the third node, the downlink data that is in the downlink data transmitted on the first bearer and that is sent to the third node. In other words, the second node adjusts only the downlink data for the third node on the first bearer.

In Example (1), step 101 in this embodiment of this application may be implemented in the following manner: The first node calculates the downlink buffer status of the first bearer based on a mapping relationship between a second bearer between the first node and the child node and the first bearer between the first node and the parent node.

Specifically, each egress bearer between the first node and the child node is mapped to an ingress bearer between the first node and the parent node according to the mapping rule. There may be a many-to-one or one-to-one mapping relationship between egress bearers and ingress bearers. To be specific, each ingress bearer between the first node and the parent node is associated with one or more egress bearers between the first node and the child node. Therefore, the first node may determine a buffer size of each ingress bearer between the first node and the parent node (if one ingress bearer corresponds to a plurality of egress bearers between the first node and the child node, downlink buffer sizes of the plurality of egress bearers are accumulated, to obtain the downlink buffer size of the ingress bearer).

Further, if the downlink buffer occupancy ratio of the first bearer needs to be determined, the downlink buffer occupancy ratio of the first bearer may be determined based on the downlink buffer size of the first bearer and the total downlink buffer size of the first bearer. For another downlink buffer status, refer to the descriptions herein. Details are not described below again.

It should be understood that the mapping relationship between the second bearer between the first node and the child node and the first bearer between the first node and the parent node may be configured by the donor node or the parent node of the first node for the first node.

It should be understood that the third node in this embodiment of this application may represent one or more target nodes for the downlink data transmitted on the first bearer. For example, the third node may represent a target node 1 for downlink data 1 transmitted on the RLC channel, a target node 2 for downlink data 2 transmitted on the RLC channel, and a target node 3 for downlink data 3 transmitted on the RLC channel.

When the first information needs to be fed back to the donor node, to enable the donor node to identify a specific hop on which congestion occurs in a multi-hop scenario, in this embodiment of this application, when sending the first information to the second node, the first node may further send information about a congested node/link to the second node. The information about the congested node/link may be identification information of the first node, or may be a link identifier of the congested link. Specifically, the identification information of the first node may be an identifier that is allocated by the donor node to the first node and that is unique to any donor node, or an identifier that is unique to an entire network. The link identifier may also be a unique identifier allocated by the donor node.

Example (2): Granularity of the Third Node on the First Bearer

In a data transmission process, identification information that is of a target node and that is in routing information is visible to all intermediate IAB nodes. Therefore, a downlink buffer status at a granularity of each third node on the first bearer may be fed back to the parent node of the first node or the donor node, and the parent node of the first node or the donor node controls, based on received identification information of the third node or a received downlink buffer status of the third node, a transmission rate of downlink data to be sent to the third node on the first bearer.

As shown in FIG. 11, for example, the IAB node 2 feeds back a downlink buffer status at a granularity of each third node on the first bearer to the IAB node 1. The IAB node 1 may determine a downlink buffer status that is in the downlink buffer status of the IAB node 2, that is on the first bearer, and that is sent to the terminal 1, the terminal 2, the IAB node 3, or the IAB node 4. If the downlink buffer status that is on the first bearer and that is sent to the terminal 1 is determined, the downlink buffer status that is on the first bearer and that is sent to the terminal 1 includes a common buffer size on all RBs that is on the first bearer and that is sent to the terminal 1.

If the downlink buffer status that is on the first bearer and that is sent to the terminal 2 is determined, the downlink buffer status includes a common buffer size on all RBs that is on the first bearer and that is sent to the terminal 2. If the downlink buffer status that is on the first bearer and that is sent to the IAB node 3 is determined, the downlink buffer status includes downlink buffer statuses of all DRBs corresponding to all terminals served by the IAB node 3. If the downlink buffer status that is on the first bearer and that is sent to the IAB node 4 is determined, the downlink buffer status includes downlink buffer statuses of all DRBs corresponding to all terminals served by the IAB node 4.

It should be understood that the IAB node 3 is an IAB node accessed by the terminal 1, and the IAB node 4 is an IAB node accessed by the terminal 2. If there are still several IAB nodes between the IAB node 3 and the IAB node 2, the downlink buffer status of the IAB node 3 is also determined.

In a third possible implementation, the downlink buffer status includes a downlink buffer status of the third node on the first bearer, and the third node is a target node for the downlink data transmitted on the first bearer.

Optionally, the first information includes identification information of the first bearer and identification information of the third node.

In a fourth possible implementation, the first information further includes a downlink buffer size of the third node on the first bearer.

For example, the downlink buffer size of the third node on the first bearer includes any one or more of the following information: a remaining downlink buffer size of the third node on the first bearer, a downlink buffer occupancy ratio of the third node on the first bearer, a second expected downlink transmission rate, a congestion level of the third node on the first bearer, and a downlink buffer size combination of the third node on the first bearer; and the downlink buffer size combination of the third node on the first bearer includes a total downlink buffer size of the third node on the first bearer and a current downlink buffer size of the third node on the first bearer.

The remaining downlink buffer size of the third node on the first bearer is used to determine a remaining buffer size of the third node on the first bearer in a downlink transmission process. The remaining downlink buffer size of the third node on the first bearer may be obtained by subtracting the current downlink buffer size of the third node on the first bearer from the total downlink buffer size of the third node on the first bearer.

The second expected downlink transmission rate is used to indicate an expected transmission rate of downlink data to be transmitted to the third node on the first bearer. When the first information includes the second expected downlink transmission rate, step 104 may be specifically implemented in the following manner: The second node controls, based on the second expected downlink transmission rate, the transmission rate of the downlink data to be transmitted to the third node by using the first bearer.

It should be understood that the first bearer not only bears the downlink data to be sent to the third node, but also may bear downlink data to be sent to another node (for example, a fourth node). If the downlink data to be sent to the third node encounters congestion at the first node but the downlink data to be sent to the fourth node does not encounter congestion, the downlink buffer status of the third node on the first bearer is reported, so that the second node can control the transmission rate of the downlink data to be sent to the third node on the first bearer, but a transmission rate of the downlink data to be sent to the fourth node on the first bearer is not affected. In other words, the second node adjusts only the transmission rate of the downlink data to be sent to the third node on the first bearer.

For example, both downlink data 1 sent to the third node and downlink data 2 sent to the fourth node are transmitted on the first bearer. If the first node sends the downlink buffer status of the third node on the first bearer to the second node, and the second node determines that congestion occurs or is about to occur at the third node on the first bearer, the second node may reduce or stop a transmission rate of the downlink data 1 or stop a transmission of the downlink data 1, and maintain a transmission rate of the downlink data 2 unchanged.

The congestion level of the third node on the first bearer is used to reflect a congestion degree of a buffered data amount of the third node on the first bearer. For descriptions of the congestion level of the third node on the first bearer, refer to the descriptions of the congestion level of the first bearer.

It should be noted that because the first node may be the third node or a parent node of another child node, the first bearer may bear both downlink data of the third node and downlink data of the another child node. Therefore, the first node may determine the congestion level of the third node on the first bearer based on a percentage of the buffered data amount of the third node on the first bearer. The percentage of the buffered data amount of the third node on the first bearer may be determined based on a ratio between a buffered data amount of the downlink data to be sent to the third node on the first bearer and a total buffer size pre-allocated to the third node on the first bearer, or may be determined based on a ratio between a buffered data amount of the downlink data to be sent to the third node on the first bearer and a total downlink buffer size of the first bearer/a total pre-allocated downlink buffer size.

For example, when the percentage of the buffered data amount of the third node on the first bearer reaches 20%, the first node determines that the third node does not encounter congestion on the first bearer. When the percentage of the buffered data amount of the third node on the first bearer reaches 85%, the first node determines that the third node encounters congestion on the first bearer. When the percentage of the buffered data amount of the third node on the first bearer reaches 90%, the first node determines that the third node encounters severe congestion on the first bearer.

It should be understood that in Example (2), the first information may include identification information of the first bearer and identification information of the third node. In this way, the second node determines that the downlink data to be sent to the third node by using the first bearer encounters congestion or is about to encounter congestion on the first bearer.

Certainly, in addition to the identification information of the first bearer and the identification information of the third node, the first information may further include a downlink buffer size of the third node on the first bearer. In this way, the second node independently determines, based on the downlink buffer size of the third node on the first bearer, whether congestion occurs at the third node on the first bearer.

In Example (2), step 102 may be specifically implemented in the following manner: When the downlink buffer size of the third node on the first bearer exceeds a second threshold, the first node sends the first information to the second node.

The second threshold may be pre-stored in the first node, or may be configured by the second node by using an RRC configuration message. For example, when determining that the third node accesses the relay communications system, the second node may configure, for the first node, the second threshold associated with the third node. A specific value of the second threshold is not limited in this embodiment of this application. It should be understood that the second threshold may be set based on a requirement.

Example (3): Granularity of the Third Node

The third node is a destination node to which downlink data is transmitted, and the downlink data to be sent to the third node may be transmitted to the third node through the first node. Therefore, in an optional implementation, the first information in this embodiment of this application may include any one or more of identification information of the third node and a downlink buffer size of the third node. If the first information includes the identification information of the third node, the first information is used to indicate that the downlink data to be sent to the third node encounters congestion or is about to encounter congestion at the first node. Therefore, the second node needs to reduce a transmission rate of the downlink data to be sent to the third node or stop a transmission of the downlink data to be sent to the third node.

If the first information includes the identification information of the third node and the downlink buffer size of the third node, the second node may determine the third node based on the identification information of the third node, and adjust, based on the downlink buffer size of the third node, a transmission rate of the downlink data to be sent to the third node.

It should be understood that if the identification information of the third node includes identification information of a plurality of destination nodes, and the downlink buffer size of the third node includes a downlink buffer size of each of the plurality of destination nodes, the second node may determine the plurality of destination nodes, and adjust, based on the downlink buffer size of each destination node, a transmission rate of downlink data to be transmitted to each destination node.

For example, if the third node includes a terminal 1 and a terminal 2, the second node may adjust a transmission rate of downlink data sent to the terminal 1, and adjust a transmission rate of downlink data sent to the terminal 2.

For example, the downlink buffer size of the third node includes any one or more of the following information: a remaining downlink buffer size of the third node, a downlink buffer occupancy ratio of the third node, a third expected downlink transmission rate, a congestion level of the third node, and a downlink buffer size combination of the third node; and the downlink buffer size combination of the third node includes a total downlink buffer size of the third node and a current downlink buffer size of the third node.

The remaining downlink buffer size of the third node is used to determine a remaining buffer size of the third node in a downlink transmission process. The remaining downlink buffer size may be obtained by subtracting the current downlink buffer size of the third node from the total downlink buffer size of the third node.

The third expected downlink transmission rate is used to indicate an expected transmission rate of downlink data to be transmitted to the third node. When the first information includes the third expected downlink transmission rate, step 104 may be specifically implemented in the following manner: The second node controls, based on the third expected downlink transmission rate, a transmission rate of first downlink data to be sent to the first node. The first downlink data is the downlink data to be sent to the third node.

The congestion level of the third node is used to reflect a congestion degree of a buffered data amount of the third node at the first node. For descriptions of the congestion level of the third node, refer to the descriptions of the congestion level of the first bearer.

It should be noted that because the first node may be the third node or a parent node of another child node, the third node or the another child node may share a total downlink buffer size of the first node. Therefore, the first node may determine the congestion level of the third node at the first node based on a percentage of the buffered data amount of the third node at the first node. The percentage of the buffered data amount of the third node at the first node may be obtained based on the downlink buffer size of the third node at the first node and the total downlink buffer size of the first node.

For example, when the percentage of the buffered data amount of the third node at the first node reaches 20%, the first node determines that the third node does not encounter congestion at the first node. When the percentage of the buffered data amount of the third node at the first node reaches 85%, the first node determines that the third node encounters congestion at the first node. When the percentage of the buffered data amount of the third node at the first node reaches 90%, the first node determines that the third node encounters severe congestion at the first node.

It should be understood that in Example (3), the first information may include any one or more of identification information of the third node and a downlink buffer size of the third node. If the first information includes the identification information of the third node, the first information is used to indicate that the downlink data to be sent to the third node encounters congestion or is about to encounter congestion at the first node. Therefore, the second node needs to reduce a transmission rate of the downlink data to be sent to the third node or stop a transmission of the downlink data to be sent to the third node.

If the first information includes the identification information of the third node and the downlink buffer size of the third node, the second node may adjust, based on the first information, a transmission rate of downlink data to be transmitted to each third node.

For example, as shown in FIG. 11, the second node is a donor node and the first node is the IAB node 1. If the first information includes identification information of the IAB node 3 and identification information of the IAB node 4, the donor node may adjust, based on the identification information of the IAB node 3, a transmission rate of downlink data to be sent to the IAB node 3 through the IAB node 1, and the donor node may adjust, based on the identification information of the IAB node 4, a transmission rate of downlink data to be sent to the IAB node 4 through the IAB node 1.

In Example (2), step 102 may be specifically implemented in the following manner: When the downlink buffer size of the third node exceeds a second threshold, the first node sends the first information to the second node.

It should be understood that when the downlink buffer size of the third node exceeds the second threshold at the first node, the first node sends the first information to the second node.

The second threshold may be pre-stored in the first node, or may be configured by the second node by using an RRC configuration message. For example, when determining that the third node accesses the relay communications system, the second node may configure, for the first node, the second threshold associated with the third node. A specific value of the second threshold is not limited in this embodiment of this application. It should be understood that the second threshold may be set based on a requirement.

It should be noted herein that when the third node is used as a granularity, the downlink data to be sent to the third node may be transmitted by using a plurality of bearers between the first node and the parent node. A difference between Example (3) and Example (2) lies in that in Example (2), the second node adjusts only the transmission rate of the downlink data to be sent to the third node on the first bearer, and in Example (3), the second node adjusts the transmission rate of all the downlink data to be sent to the third node.

Specific content of the first information is mainly described in the foregoing embodiment, and a condition for triggering the first node to send the first information is mainly described in Example (4) to Example (6).

Example (4): Passively Triggered Feedback

Figure 14:
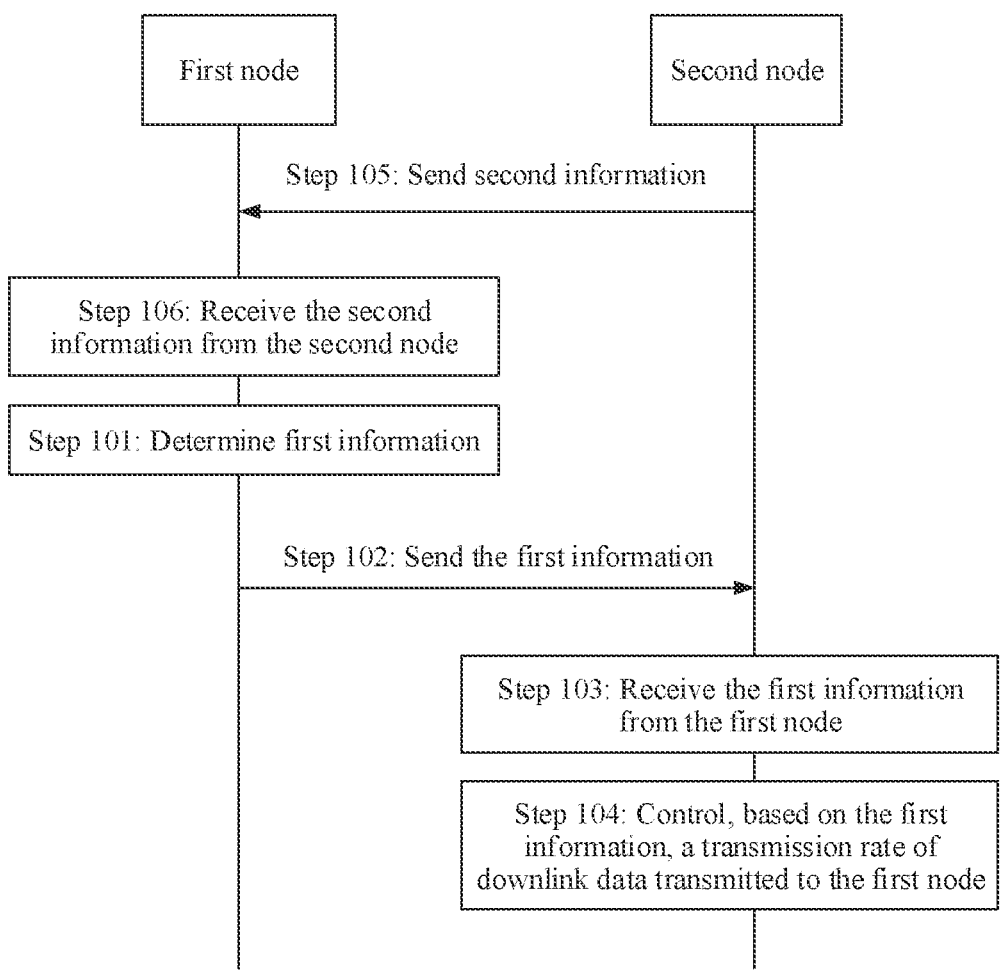
FIG. 14 is a schematic flowchart 2 of a downlink buffer status feedback method according to an embodiment of this application.

In a possible embodiment, as shown in FIG. 14, the method provided in this embodiment of this application further includes the following steps.

Step 105: The second node sends second information to the first node, where the second information is used to request the first information.

Specifically, when the second node determines that the transmission rate of the downlink data sent to the first node needs to be controlled, the second node may perform step 105. For example, the second information may also be referred to as flow control feedback trigger information. Alternatively, the second node sends the second information to the first node based on a preset period.

It should be noted that if the second node is a wireless backhaul node, the second information may be used to request to transmit the first information to the second node, or may be used to request to transmit the first information to the donor node. If the second node is the donor node, the second information may be used to request to transmit the first information to the parent node of the first node, or may be used to request to transmit the first information to the donor node.

Step 106: The first node receives the second information from the second node.

It should be understood that the second information is used to trigger the first node to perform step 102. If the first node does not include the first information when the first node receives the second information, the first node needs to determine the first information based on the second information. If the first node includes the first information when the first node receives the second information, the first node may directly perform step 102. Certainly, the first node may alternatively re-obtain the first information.

Example (5): Event-Triggered Feedback

When the first node determines that a preset condition is met, the first node sends the first information to the second node. For example, the preset condition includes any one or more of the following information: indication information indicating that a downlink buffer size of the first bearer exceeds a first threshold, indication information indicating that a downlink buffer size of a second bearer on a wireless backhaul link between the first node and a child node of the first node exceeds a third threshold, indication information indicating that a downlink buffer size of the third node on the first bearer exceeds a second threshold, indication information indicating that a downlink buffer size of a logical channel corresponding to the first bearer or the second bearer exceeds a fourth threshold, and indication information indicating that an RLC entity corresponding to the first bearer, or an RLC entity corresponding to the second bearer, or a MAC entity corresponding to the first bearer, or a MAC entity corresponding to the second bearer exceeds a specified threshold.

It should be noted that the specified threshold, the first threshold, the second threshold, the third threshold, and the fourth threshold in this embodiment of this application may be configured by the donor node for the first node. It should be understood that values of the first threshold, the second threshold, the third threshold, and the fourth threshold in this embodiment of this application may be the same or different. This is not limited in this application.

Example (6): Periodic Feedback

Step 102 may be specifically implemented in the following manner: The first node periodically sends the first information to the second node based on a preset period.

For example, the first node may be triggered based on a periodic timer. When the timer expires, the first node is triggered to send the first information to the second node.

The preset period may be configured by the donor node for the first node.

It should be noted that if the first node may determine, based on Example (5) or Example (6), to report the first information, step 105 and step 106 may alternatively be omitted. Certainly, in this embodiment of this application, after receiving the second information, the first node may alternatively determine, with reference to Example (5) or Example (6), to report the first information.

In a possible implementation, the trigger actions described above may be further classified into two implementations: MT side triggering and DU side triggering.

(1) MT Side Triggering

An MT in the first node may be triggered based on the trigger condition in Example (4) to Example (6) to send the first information to the second node. In other words, the MT in the first node receives the second information from the second node, or the trigger condition in Example (4) to Example (6) is configured for the MT in the first node.

(2) DU Side Triggering

A DU in the first node is triggered based on the trigger condition in Example (4) to Example (6) to send the first information to the second node. In other words, the DU in the first node receives the second information from the second node, or the trigger condition in Example (4) to Example (6) is configured for the DU in the first node.

When the DU side is triggered to send the first information, in an example, the DU may directly send the first information to the second node. In another example, the DU may send the obtained first information to the MT in the first node, so that the MT in the first node sends the first information to the second node.

The second node sends the second information to the DU in the first node. Alternatively, the second node configures the preset condition in Example (5) or the preset period in Example (6) for the DU in the first node. When determining that a condition for feeding back the first information is met, the DU in the first node determines the first information. Then, the DU in the first node sends the first information to a CU in the second node through an F1 interface, or the DU in the first node feeds back the first information to the MT in the first node. The MT in the first node sends the obtained first information to the second node.

The following mainly describes a feedback manner in which the first node feeds back the first information.

Feedback manner 1: As described above, because an adaptation layer is newly added to an IAB node, it may be considered that an adaptation layer message is used to control feedback of the first information. For example, control information is added to adaptation layer signaling or an adaptation layer data packet header. An advantage of this example is that a specific bearer can be controlled because information about a bearer or a PDCP bearer can be obtained at the adaptation layer. For another example, the first information is transmitted by using an RLC layer control message or an RLC layer data packet header (for example, a control PDU). In this case, an RLC control message needs to be newly added or a format of the RLC data packet header needs to be modified. The first information may alternatively be transmitted by using media access control signaling (media access control control element, MAC CE). If the first information is transmitted by using the MAC CE, a signaling format of the MAC CE needs to be redefined to transmit the first information. Specifically, definition of the signaling format depends on a protocol.

In a possible embodiment, step 102 in this embodiment of this application may be implemented in the following manner: An MT in the first node sends the first information to a DU in the second node by using media access control MAC layer signaling or adaptation layer signaling. Therefore, step 103 may be implemented in the following manner: The DU in the second node receives the MAC layer signaling or the adaptation layer signaling from the MT in the first node, to receive the first information from the first node.

Figure 15:
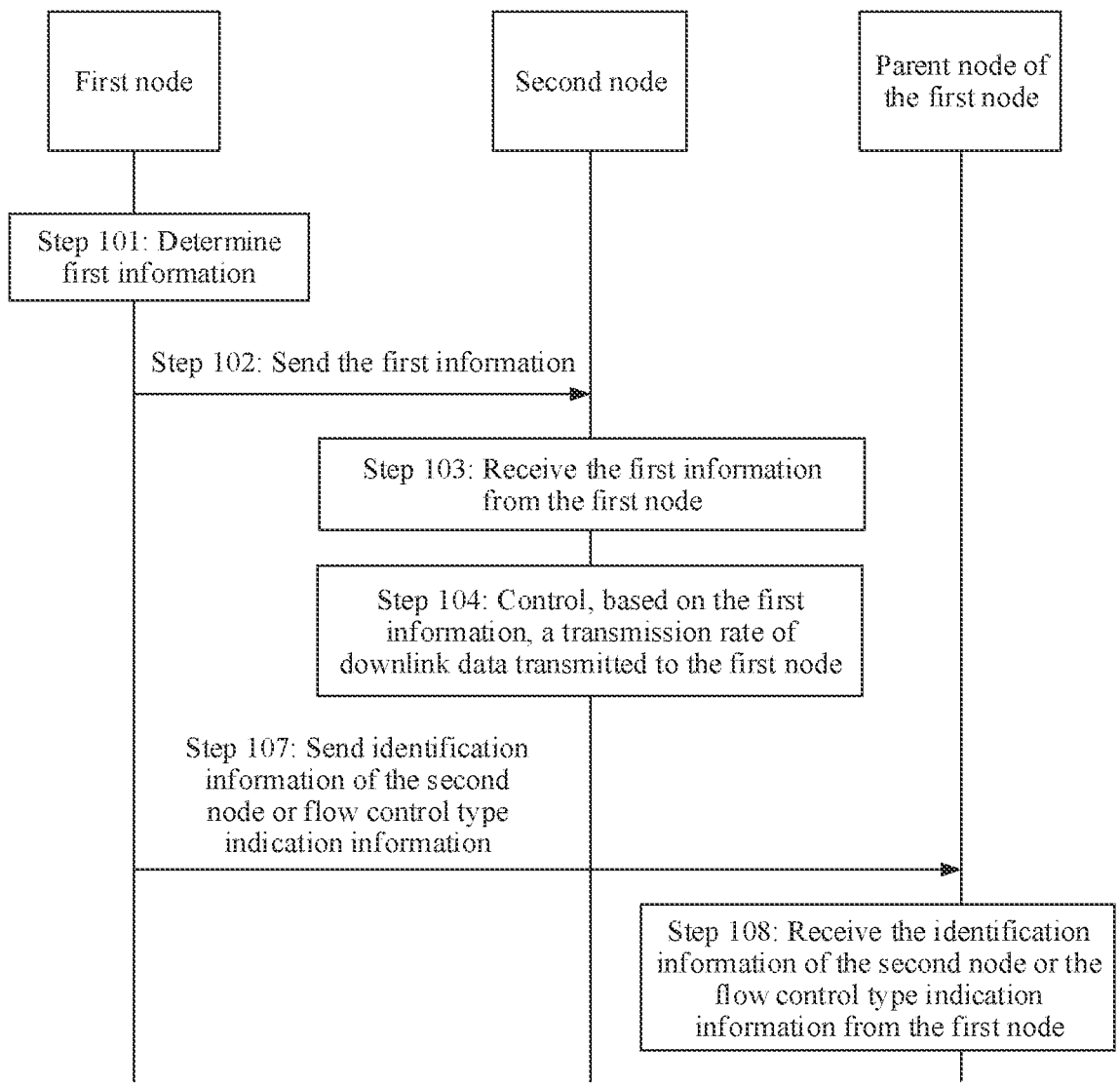
FIG. 15 is a schematic flowchart 3 of a downlink buffer status feedback method according to an embodiment of this application.

When the first information is fed back in the foregoing manners, because all the foregoing feedback manners are based on layer 2 feedback, in conventional air transmission, layer 2 control signaling is sent by either of the terminal and the base station, and is received and parsed by the other party, and in an IAB scenario, for layer 2 first information sent by an IAB node, the second node may be a parent node or a donor node. Therefore, as shown in FIG. 15, the method provided in this embodiment of this application further includes the following steps.

Step 107: The first node sends identification information of the second node or flow control type indication information to the parent node of the first node. When the second node is the parent node of the first node, the flow control type indication information indicates that a target receiving node of the first information is the parent node of the first node. Alternatively, when the second node is the donor node, the flow control type indication information indicates that a target receiving node of the first information is the donor node. A routing type of the first information is identified or the target receiving node of the first information is identified as the third node, so that the first information can support both hop-by-hop flow control and end-to-end flow control.

In this embodiment of this application, the identification information of the second node or the flow control type indication information may be carried in the first information. Certainly, the identification information of the second node or the flow control type indication information may alternatively be carried in third information and sent by the first node to the parent node of the first node. This is not limited in this embodiment of this application.

It should be understood that the identification information of the second node is used to indicate the parent node of the first node to send the first information to the second node. If the parent node of the first node is not the second node, the parent node of the first node forwards the first information to the second node. If the parent node of the first node is the second node, the parent node of the first node may perform step 104 based on the first information.

The third information in this embodiment of this application may be referred to as routing information. The routing information may be carried in a MAC CE, a control PDU at an RLC layer, or a control PDU packet header at an adaptation layer.

In a possible implementation, the first node adds, only to first information to be sent to the donor node, the identification information of the second node as routing information. In this embodiment of this application, a receiving node and a sending node may agree that if the sending node does not send the routing information to the receiving node, the receiving node is specified as a parent node of the sending node. To distinguish between two flow control types, 1-bit information further needs to be added to a packet header to indicate whether the first information includes a routing information field. If the first information includes the routing information field, the routing information field may be located after the 1-bit information.

For example, when the second node is the donor node, the identification information of the second node may be identification information of a donor DU, identification information of a donor CU, or identification information of a donor CU-UP.

In another possible implementation, the first node separately adds routing information to first information to be sent to the donor node and first information to be sent to the parent node. For a manner in which the first node adds the routing information to the first information to be sent to the donor node, refer to the foregoing descriptions. Details are not described herein again. The first node may add, to the first information to be sent to the parent node, identification information of the parent node as the routing information.

For example, the identification information of the parent node may be an identifier of a DU in the parent node, or identification information of an MT in the parent node.

In still another possible implementation, the first node may add the flow control type indication information to first information to be sent to the second node. For example, the flow control type indication information is used to indicate that a routing type of the first information is hop-by-hop flow control. Alternatively, the flow control type indication information is used to indicate that a routing type of the first information is end-to-end flow control.

If the routing type of the first information is end-to-end flow control, it indicates that a target receiving node of the first information is the donor node. If the routing type of the first information is hop-by-hop flow control, it indicates that a target receiving node of the first information is the parent node of the first node.

Step 108: The parent node of the first node receives the identification information of the second node or the flow control type indication information from the first node.

It should be understood that if the second node is the parent node of the first node, step 108 is performed by the second node.

As described above, if the parent node of the first node is the relay node rather than the donor node, and if the parent node of the first node determines, based on the third information, that the first information is to be transmitted to the donor node, the parent node of the first node may forward the first information to the donor node. If the parent node of the first node determines, based on the third information, that the first information is to be transmitted to the parent node of the first node, the parent node of the first node may determine, based on the first information, to perform step 104.

In a possible implementation, the parent node of the first node may determine, in the following manner, that the first information is to be transmitted to the parent node of the first node: The parent node of the first node determines that a flow control feedback type in the first information is hop-by-hop flow control. Alternatively, the parent node of the first node determines that the first information carries identification information of the parent node. In a possible implementation, the parent node of the first node may determine, in the following manner, that the first information is to be transmitted to the donor node: The parent node of the first node determines that a flow control type of the first node is end-to-end flow control. Alternatively, the parent node of the first node determines that the first information carries identification information of the donor node.

Feedback manner 2: If the second node is the donor node, in a possible implementation, step 102 in this embodiment of this application may be specifically implemented in the following manner: A DU in the first node sends the first information to a CU in the donor node through an F1 interface. Correspondingly, step 103 may be implemented in the following manner: The CU in the second node receives the first information from the DU in the first node through the F1 interface.

Specifically, the DU in the first node may feed back the first information by using user plane (F1-U) signaling or F1-AP signaling at the F1 interface between the DU in the first node and the CU in the donor node.

Alternatively, in another possible implementation, step 102 in this embodiment of this application may be specifically implemented in the following manner: An MT in the first node sends the first information to a CU in the donor node by using RRC signaling between the MT in the first node and the donor node. Correspondingly, the second node receives the first information from the MT in the first node by using the RRC signaling.

Specifically, the MT in the first node sends the first information to the CU in the donor node by using the radio resource control RRC signaling.

Feedback manner 3: A PDU type (which may be referred to as a flow control feedback PDU) is newly added to a user plane PDU at an F1 interface in NR, and is used to feed back first information at a granularity of each ingress bearer or egress bearer/a granularity of each child node/a granularity of each target receiving node.

For content carried in the flow control feedback PDU, refer to the content carried in the first information. Details are not described herein again.

The foregoing mainly describes the solutions in the embodiments of this application from a perspective of interaction between the network elements. It may be understood that to implement the foregoing functions, each network element, for example, the first node or the second node, includes corresponding hardware structures and/or software modules for performing the functions. A person skilled in the art should be easily aware that units, algorithms, and steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first node and the second node may be divided into function units based on the foregoing method examples. For example, each function unit may be obtained through division based on each corresponding function, or two or more functions may be integrated into one processing unit. The integrated unit may be implemented in a form of hardware, or may be implemented in a form of a software function unit. It should be noted that in the embodiments of this application, division into the units is an example and is merely logical function division, and may be other division in an actual implementation.

The foregoing describes the methods in the embodiments of this application with reference to FIG. 13 to FIG. 15. The following describes communications apparatuses that are provided in embodiments of this application and that perform the foregoing methods. A person skilled in the art may understand that the method and the apparatus may be mutually combined and referenced. A communications apparatus provided in the embodiments of this application may perform the method performed by a transmit end in the foregoing downlink buffer status feedback method, namely, the steps performed by the first node. Another communications apparatus provided in the embodiments of this application may perform the method performed by a receive end in the downlink buffer status feedback method in the foregoing embodiments, namely, the steps performed by the second node.

An example in which each function module is obtained through division based on each corresponding function is used below for description.

Figure 16:
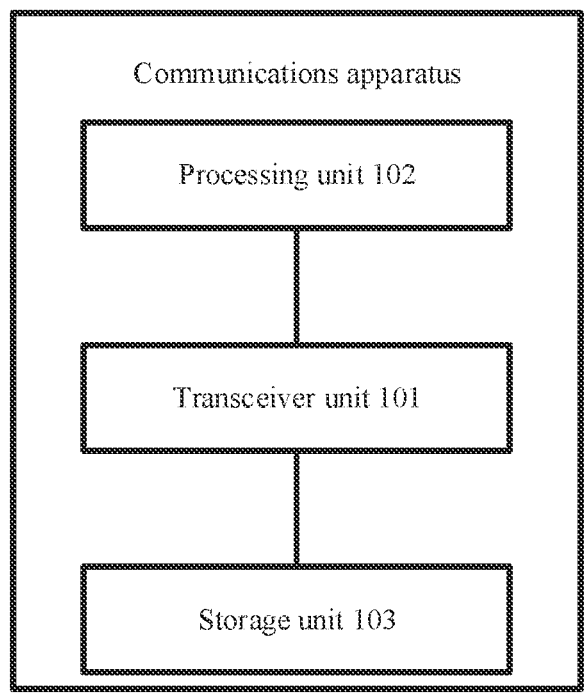
FIG. 16 is a schematic structural diagram 1 of a communications apparatus according to an embodiment of this application.

FIG. 16 is a schematic structural diagram of a communications apparatus according to an embodiment of this application. The communications apparatus may be a first node or a second node in the embodiments of this application, or may be a chip used in the first node or the second node. The communications apparatus includes a transceiver unit 101 and a processing unit 102. The transceiver unit 101 is configured to support the communications apparatus in performing the step of sending or receiving information. The processing unit 102 is configured to support the communications apparatus in performing the step of processing information.

In an example, the communications apparatus is the first node or the chip used in the first node. The transceiver unit 101 is configured to support the communications apparatus in performing step 102 in the foregoing embodiment. The processing unit 102 is configured to support the communications apparatus in performing step 101 in the foregoing embodiment.

In an optional implementation, the transceiver unit 101 is further configured to support the communications apparatus in performing step 106 and step 107 in the foregoing embodiment.

In another example, the communications apparatus is the second node or the chip applied to the second node. The transceiver unit 101 is configured to support the communications apparatus in performing step 103 in the foregoing embodiment. The processing unit 102 is configured to support the communications apparatus in performing step 104 in the foregoing embodiment.

In an optional implementation, the transceiver unit 101 is further configured to support the communications apparatus in performing step 105 in the foregoing embodiment.

Optionally, the communications apparatus may further include a storage unit 103. The processing unit 102, the transceiver unit 101, and the storage unit 103 are connected by using a communications bus.

The storage unit 103 may include one or more memories. The memory may be a component configured to store a program or data in one or more devices or circuits.

The storage unit 103 may exist independently, and is connected to the processing unit 102 of the communications apparatus by using the communications bus. The storage unit 103 may alternatively be integrated into the processing unit.

The communications apparatus may be used in a communications device, a circuit, a hardware component, or a chip.

The communications apparatus may be the chip in the first node/the second node in the embodiments of this application. The transceiver unit 101 may be an input/output interface, a pin, a circuit, or the like. Optionally, the storage unit 103 may store computer executable instructions of a method on a first node/second node side, so that the processing unit 102 performs the method on the first node/second node side in the foregoing embodiment. The storage unit 103 may be a register, a cache, a RAM, or the like, and the storage unit 103 may be integrated into the processing unit 102. The storage unit 103 may be a ROM or another type of static storage device that can store static information and instructions. The storage unit 103 may be independent of the processing unit 102.

An embodiment of this application provides a communications apparatus. The communications apparatus includes one or more modules, configured to implement step 101 to step 108 in the methods. The one or more modules may correspond to the steps of the methods including step 101 to step 108. Specifically, in this embodiment of this application, for each step in the method performed by the first node, the first node includes a unit or a module for performing each step in the method. For each step in the method performed by the second node, the second node includes a unit or a module for performing each step in the method.

Figure 17:
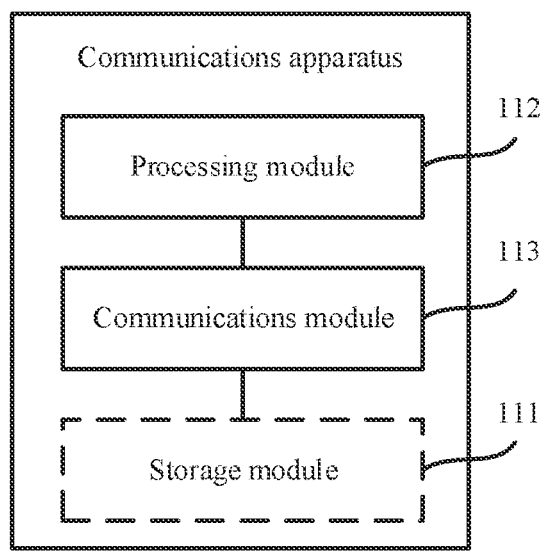
FIG. 17 is a schematic structural diagram 2 of a communications apparatus according to an embodiment of this application.

For example, when an integrated unit is used, FIG. 17 is a possible schematic logical structural diagram of a communications apparatus in the foregoing embodiments. The communications apparatus may be the first node in the foregoing embodiments or a chip used in the first node. Alternatively, the communications apparatus may be the second node in the foregoing embodiments or a chip used in the second node. The communications apparatus includes a processing module 112 and a communications module 113. The processing module 112 is configured to: control and manage an action of the communications apparatus. The communications module 113 is configured to perform the step of processing a message or data on the communications apparatus side.

Optionally, the communications apparatus may further include a storage module 111, configured to store program code and data that are of the communications apparatus.

For example, the communications apparatus may be the first node in the foregoing embodiments or the chip applied to the first node. The communications module 113 is configured to support the communications apparatus in performing step 102 in the foregoing embodiment. The processing module 112 is configured to support the communications apparatus in performing step 101 in the foregoing embodiment, and/or is configured to perform another process performed by the communications apparatus in the technology described in this specification. In an optional implementation, the communications module 113 is further configured to support the communications apparatus in performing step 106 and step 107 in the foregoing embodiment.

In another example, the communications apparatus may be the second node in the foregoing embodiments or the chip applied to the second node. The communications module 113 is configured to support the communications apparatus in performing step 103 in the foregoing embodiment. The processing module 112 is configured to support the communications apparatus in performing step 104 in the foregoing embodiment.

In an optional implementation, the communications module 113 is further configured to support the communications apparatus in performing step 105 in the foregoing embodiment.

The processing module 112 may be a processor or a controller, for example, may be a central processing unit, a general-purpose processor, a digital signal processor, an application-specific integrated circuit, a field-programmable gate array or another programmable logic device, a transistor logic device, a hardware component, or any combination thereof. The processing module 112 may implement or execute various example logical blocks, modules, and circuits described with reference to content disclosed in the present invention. Alternatively, the processor may be a combination of processors implementing a computing function, for example, a combination of one or more microprocessors, or a combination of a digital signal processor and a microprocessor. The communications module 113 may be a communications interface, a transceiver, a transceiver circuit, an interface circuit, or the like. The storage module 111 may be a memory.

Figure 18:
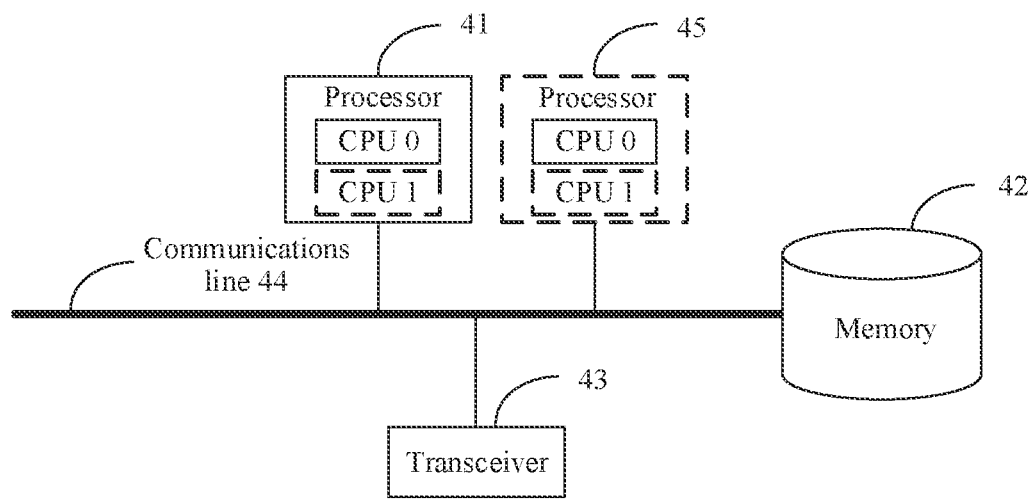
FIG. 18 is a schematic structural diagram 3 of a communications apparatus according to an embodiment of this application.

When the processing module 112 is the processor, the communications module 113 is the transceiver, and the storage module 111 is the memory, the communications apparatus in this application may be a communications device shown in FIG. 18.

FIG. 18 is a schematic diagram of a hardware structure of a communications device according to an embodiment of this application. For a hardware structure of a first node or a second node, refer to the structure shown in FIG. 18. The communications device includes a processor 41, a communications line 44, and at least one transceiver (In FIG. 18, that the communications device includes a transceiver 43 is merely used as an example for description).

Optionally, the communications device may further include a memory 42.

The processor 41 may be a general-purpose central processing unit (CPU), a microprocessor, an application-specific integrated circuit (ASIC), or one or more integrated circuits configured to control program execution of the solutions of this application.

The communications line 44 may include a channel for transmitting information between the foregoing components.

The transceiver 43 is any apparatus such as a transceiver, and is configured to communicate with another device or a communications network such as the Ethernet, a radio access network (RAN), or a wireless local area network (WLAN).

The memory 42 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory 42 is not limited thereto. The memory may exist independently, and is connected to the processor through the communications line 44. The memory may alternatively be integrated into the processor.

The memory 42 is configured to store computer executable instructions for performing the solutions in this application, and the processor 41 controls execution of the computer executable instructions. The processor 41 is configured to execute the computer executable instructions stored in the memory 42, to implement the downlink buffer status feedback method provided in the foregoing embodiment of this application.

Optionally, the computer executable instructions in this embodiment of this application may also be referred to as application program code. This is not specifically limited in this embodiment of this application.

In a specific implementation, in an embodiment, the processor 41 may include one or more CPUs, for example, a CPU 0 and a CPU 1 in FIG. 18.

In a specific implementation, in an embodiment, the communications device may include a plurality of processors, for example, the processor 41 and a processor 45 in FIG. 18. Each of the processors may be a single-core: processor (single-CPU) or a multi-core processor (multi-CPU). The processor herein may be one or more devices, circuits, and/or processing cores configured to process data (for example, computer program instructions).

Figure 19:
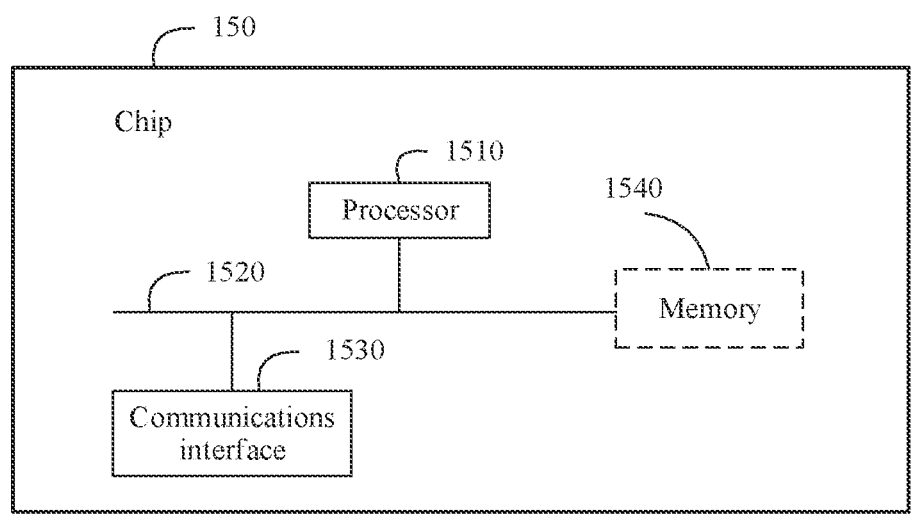
FIG. 19 is a schematic structural diagram of a chip according to an embodiment of this application.

FIG. 19 is a schematic structural diagram of a chip 150 according to an embodiment of the present invention. The chip 150 includes one or more (including two) processors 1510 and a communications interface 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following elements: an executable module or a data structure, or a subset thereof, or an extension set thereof.

In this embodiment of the present invention, a corresponding operation is performed by invoking the operation instructions stored in the memory 1540 (where the operation instructions may be stored in an operating system).

In a possible implementation, a first node and a second node use a similar chip structure, and different apparatuses may use different chips to implement respective functions.

The processor 1510 controls operations of the first node and the second node, and the processor 1510 may also be referred to as a central processing unit (CPU). The memory 1540 may include a read-only memory and a random access memory, and provide instructions and data for the processor 1510. A part of the memory 1540 may further include a non-volatile random access memory (NVRAM). For example, in an application, the memory 1540, the communications interface 1530, and the memory 1540 are coupled together through a bus system 1520. The bus system 1520 may further include a power bus, a control bus, a status signal bus, and the like in addition to a data bus. However, for clear description, various types of buses in FIG. 19 are marked as the bus system 1520.

The foregoing transceiver unit may be an interface circuit or a communications interface of the apparatus, and is configured to receive a signal from another apparatus. For example, when the apparatus is implemented as a chip, the transceiver unit is an interface circuit or a communications interface that is of the chip and that is configured to receive a signal from another chip or apparatus or send a signal.

The method disclosed in the foregoing embodiments of the present invention may be applied to the processor 1510, or implemented by the processor 1510. The processor 1510 may be an integrated circuit chip and has a signal processing capability. In an implementation process, steps in the foregoing method may be implemented by using a hardware integrated logical circuit in the processor 1510, or by using instructions in a form of software. The processor 1510 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 1510 may implement or perform the methods, the steps, and logical block diagrams that are disclosed in the embodiments of the present invention. The general-purpose processor may be a microprocessor, or the processor may be any conventional processor or the like. The steps of the methods disclosed with reference to the embodiments of the present invention may be directly performed and completed by a hardware decoding processor, or performed and completed by a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In a possible implementation, the communications interface 1530 is configured to perform the receiving and sending steps of the first node and the second node in the embodiments shown in FIG. 13 to FIG. 15. The processor 1510 is configured to perform the processing steps of the first node and the second node in the embodiments shown in FIG. 13 to FIG. 15.

In the foregoing embodiment, the instructions that are stored in the memory and that is to be executed by the processor may be implemented in a form of a computer program product. The computer program product may be written into the memory in advance, or may be downloaded in a form of software and installed in the memory.

The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

An embodiment of this application further provides a computer readable storage medium. The method described in the foregoing embodiment may be all or partially implemented by using software, hardware, firmware, or any combination thereof. If the method is implemented in software, the functions used as one or more instructions or code may be stored or transmitted on the computer readable medium. The computer readable medium may include a computer storage medium and a communications medium, and may further include any medium that can transfer a computer program from one place to another. The storage medium may be any target medium that can be accessed by a computer.

In an optional design, the computer readable medium may include a RAM, a ROM, an EEPROM, a CD-ROM or another optical disc storage, a magnetic disk storage or another magnetic storage device, or any other medium that is used to carry or store required program code in a form of instructions or a data structure and that may be accessed by the computer. In addition, any connection is appropriately referred to as a computer readable medium. For example, if a coaxial cable, an optical fiber cable, a twisted pair, a digital subscriber line (DSL), or wireless technologies (such as infrared, radio, and a microwave) are used to transmit software from a website, a server, or another remote source, the coaxial cable, the optical fiber cable, the twisted pair, the DSL or the wireless technologies such as infrared, radio, and a microwave are included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combination should also be included within the scope of the computer readable medium.

An embodiment of this application further provides a computer program product. The method described in the foregoing embodiment may be all or partially implemented by using software, hardware, firmware, or any combination thereof. When the method is implemented in software, the method may be all or partially implemented in a form of a computer program product. The computer program product includes one or more computer instructions. When the foregoing computer program instructions are loaded and executed on a computer, the procedures or functions described in the foregoing method embodiments are all or partially generated. The computer may be a general-purpose computer, a dedicated computer, a computer network, a base station, a terminal, or another programmable apparatus.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, improvement, or the like made based on the technical solutions of the present invention shall fall within the protection scope of the present invention.

What is claimed is:

1. An apparatus for a first node, comprising at least one processor and a non-transitory memory storage coupled to the at least one processor and storing programming instructions for execution by the at least one processor, wherein the programming instructions instruct the at least one processor to perform operations comprising:
   determining first information, wherein the first information indicates a downlink buffer status of a first bearer between the first node and a second node, and the first bearer is an ingress radio link control (RLC) channel, and the first information comprises a logical channel identifier (LCID) that identifies the ingress RLC channel; and
   sending the first information to the second node, wherein the first node is a relay node in a wireless relay communications system, and the second node is a parent node of the first node.

2. The apparatus according to claim 1, wherein the first information comprises a downlink buffer size of the first bearer.

3. The apparatus according to claim 2, wherein the downlink buffer size of the first bearer comprises one or more of the following: a remaining downlink buffer size, a downlink buffer occupancy ratio, a first expected downlink transmission rate, a congestion level, a downlink buffer size combination, or indication information indicating whether the downlink buffer size of the first bearer exceeds a preset buffer size; and wherein the downlink buffer size combination comprises a total downlink buffer size and a current downlink buffer size.

4. The apparatus according to claim 1, wherein the operations further comprise:
   receiving second information from the second node, wherein the second information requests the first information.

5. The apparatus according to claim 1, wherein the first information is carried in media access control (MAC) layer signaling or adaptation layer signaling.

6. The apparatus according to claim 5, wherein the MAC layer signaling or the adaptation layer signaling is transmitted from a mobile terminal (MT) in the first node to a distributed unit (DU) in the second node.

7. An apparatus for a second node, comprising at least one processor and a non-transitory memory storage coupled to the at least one processor and storing programming instructions for execution by the at least one processor, wherein the programming instructions instruct the at least one processor to perform operations comprising:
   receiving first information from a first node, wherein the first information indicates a downlink buffer status of a first bearer between the first node and the second node, and the first bearer is an ingress radio link control (RLC) channel, and the first information comprises a logical channel identifier (LCID) that identifies the ingress RLC channel; and wherein
   the first node is a relay node in a wireless relay communications system, and the second node is a parent node of the first node.

8. The apparatus according to claim 7, wherein the first information comprises a downlink buffer size of the first bearer.

9. The apparatus according to claim 8, wherein the downlink buffer size of the first bearer comprises one or more of the following: a remaining downlink buffer size, a downlink buffer occupancy ratio, a first expected downlink transmission rate, a congestion level, a downlink buffer size combination, or indication information indicating whether the downlink buffer size of the first bearer exceeds a preset buffer size; and wherein the downlink buffer size combination comprises a total downlink buffer size and a current downlink buffer size.

10. The apparatus according to claim 7, wherein the operations further comprise:
    sending second information to the first node, wherein the second information requests the first information.

11. The apparatus according to claim 7, wherein the operations further comprise:
    controlling, by the second node and based on the first information, a transmission rate of downlink data transmitted to the first node.

12. The apparatus according to claim 7, wherein the first information is carried in media access control (MAC) layer signaling or adaptation layer signaling.

13. The apparatus according to claim 12, wherein the MAC layer signaling or the adaptation layer signaling is transmitted from a mobile terminal (MT) in the first node to a distributed unit (DU) in the second node.

14. A downlink buffer status feedback method, wherein the method comprises:
    determining, by a first node, first information, wherein the first information indicates a downlink buffer status of a first bearer between the first node and a second node, and the first bearer is an ingress radio link control (RLC) channel, and the first information comprises a logical channel identifier (LCID) that identifies the ingress RLC channel; and
    sending, by the first node, the first information to the second node, wherein
    the first node is a relay node in a wireless relay communications system, and the second node is a parent node of the first node.

15. The method according to claim 14, wherein the first information comprises a downlink buffer size of the first bearer.

16. The method according to claim 15, wherein the downlink buffer size of the first bearer comprises one or more of the following: a remaining downlink buffer size, a downlink buffer occupancy ratio, a first expected downlink transmission rate, a congestion level, a downlink buffer size combination, or indication information indicating whether the downlink buffer size of the first bearer exceeds a preset buffer size; and wherein the downlink buffer size combination comprises a total downlink buffer size and a current downlink buffer size.

17. The method according to claim 14, wherein the method further comprises:

receiving, by the first node, second information from the second node, wherein the second information requests the first information.

\* \* \* \* \*